(12) United States Patent
Nakai et al.

(10) Patent No.: US 7,330,163 B2
(45) Date of Patent: Feb. 12, 2008

(54) APPARATUS FOR DRIVING A PLURALITY OF DISPLAY UNITS USING COMMON DRIVING CIRCUITS

(75) Inventors: Daisaburou Nakai, Kanagawa (JP); Yoshiharu Hashimoto, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 472 days.

(21) Appl. No.: 10/671,633

(22) Filed: Sep. 29, 2003

(65) Prior Publication Data

US 2004/0169618 A1  Sep. 2, 2004

(30) Foreign Application Priority Data

Oct. 3, 2002  (JP) .............................. 2002-290637

(51) Int. Cl.
  *G09G 5/00*  (2006.01)
  *H04M 1/00*  (2006.01)
(52) U.S. Cl. .................. 345/1.1; 345/98; 345/100; 455/566; 455/575.3
(58) Field of Classification Search .............. 348/14.7, 348/52, 383; 455/566; 345/1.1–3.3, 169, 345/690, 204, 87–100, 541, 545
See application file for complete search history.

(56) References Cited

U.S. PATENT DOCUMENTS 5,841,431 A   11/1998  Simmers
5,881,299 A   3/1999   Nomura et al.
6,104,370 A * 8/2000   Nakagaki et al. ........... 345/100
6,862,014 B2* 3/2005   Ohtani et al. ................ 345/96
6,954,184 B2* 10/2005  Kurashima et al. .......... 345/1.3

FOREIGN PATENT DOCUMENTS

| | | |
|---|---|---|
| CN | 1246194 A | 3/2000 |
| EP | 0 886 221 A2 | 12/1998 |
| JP | 2002-215108 A | 7/2002 |
| WO | WO 96/16394 A1 | 5/1996 |

* cited by examiner

*Primary Examiner*—Duc Dinh
(74) *Attorney, Agent, or Firm*—Sughrue Mion, Pllc.

(57) ABSTRACT

In an apparatus for driving a plurality of display units in a mobile electronic apparatus, each including a plurality of data lines, a plurality of scan line and a plurality of pixels each provided at one of the data lines and one of the scan lines, at least one of a common data driver circuit and a common scan driver circuit is provided. The common data driver circuit includes a plurality of first switch groups, each first switch group being connected to the data lines of one of the display units for driving the data lines of the one of the display units. The common scan driver circuit includes a plurality of second switch groups, each second switch group being connected to the scan lines of one of the display units for driving the scan lines of the one of the display units.

32 Claims, 26 Drawing Sheets

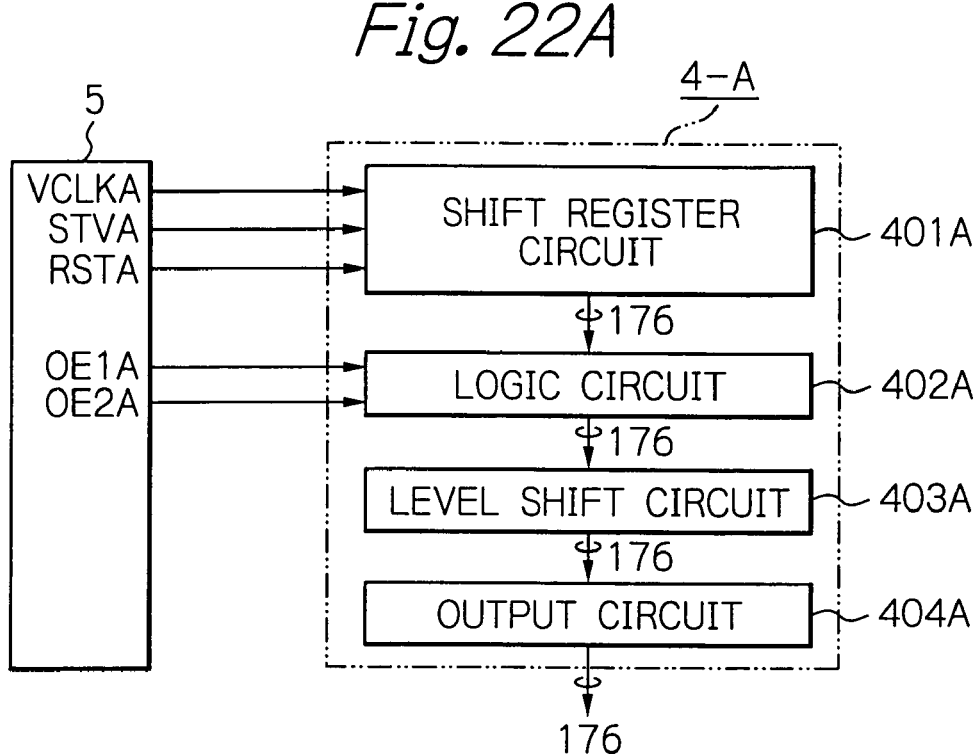
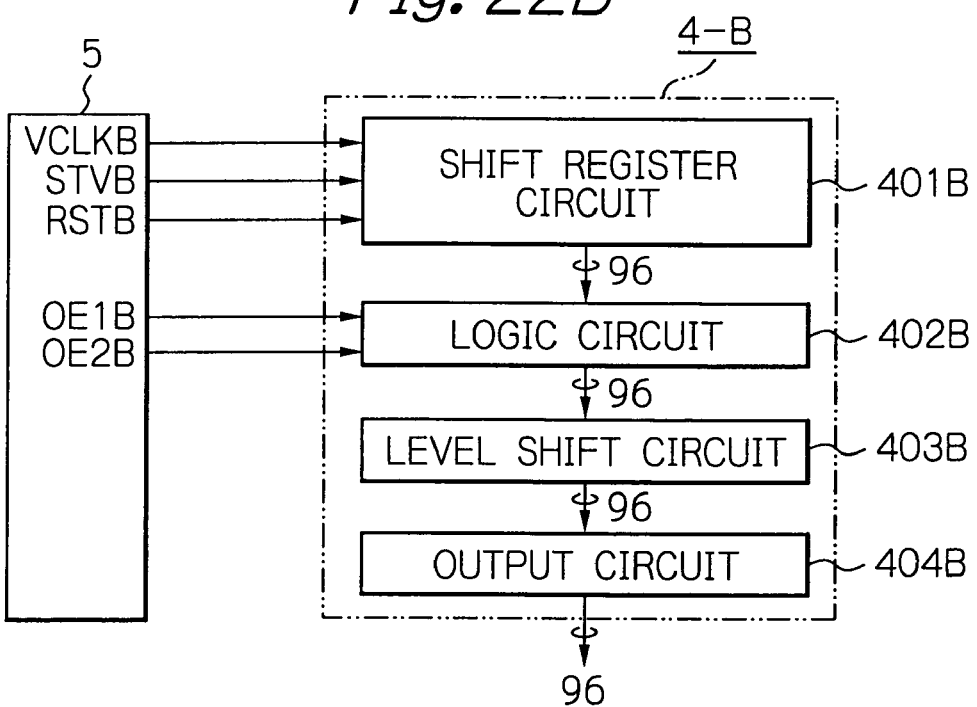

APPARATUS FOR DRIVING A PLURALITY OF DISPLAY UNITS USING COMMON DRIVING CIRCUITS

BACKGROUND OF THE INVENTION

1. Field of the Invention

The present invention relates to an apparatus for driving a plurality of display units in a mobile electronic apparatus.

2. Description of the Related Art

Recently, in a mobile electronic apparatus such as a mobile telephone apparatus, a plurality of display units, i.e., a main display unit and a sub display unit are provided on an inner side and an outer side, respectively, of a lid pivotally coupled to a body. This will be explained later in detail.

In a stand-by mode, the lid is closed to prepare for an incoming call. In this case, an antenna mark, a clock, a battery residual mark and the like are displayed on the sub display unit. On the other hand, in an operation mode, the lid is opened while the main display unit is being operated.

Also, if a camera function is incorporated into the mobile telephone apparatus, one of the main display unit and the sub display unit is used as a finder, which also will be explained later in detail.

A first prior art driving apparatus for driving the main display unit and the sub display unit is constructed by driver circuits for driving the main display unit and driver circuits for driving the sub display unit. This also will be explained later in detail.

In the above-described first prior art driving apparatus, however, since the driver circuits are provided individually for the main display unit and the sub display unit, the driving apparatus is increased in size and in cost.

In a second prior art driving apparatus for driving the main display unit and the sub display unit, the scan lines (row side lines) of the sub display unit are short-circuited to the corresponding lines of the main display unit, or the data lines (column side lines) of the sub display unit are short-circuited to the corresponding lines of the main display unit, so that the number of driver circuits is decreased. This also will be explained later in detail.

In the above-described second prior art driving apparatus, however, since the parasitic capacitance of the scan lines (row side lines) or the parasitic capacitance of the data lines (column side lines) is substantially increased, the power consumption is increased. Also, in order to drive the increased parasitic capacitance, large-sized drive transistors would be required, which increases the apparatus in size and in cost.

SUMMARY OF THE INVENTION

It is an object of the present invention to provide a driving apparatus for driving a plurality of display units capable of being decreased in size and in cost without increasing the power consumption.

According to the present invention, in an apparatus for driving a plurality of display units in a mobile electronic apparatus, each including a plurality of data lines, a plurality of scan lines and a plurality of pixels each provided at one of the data lines and one of the scan lines, at least one of a common data driver circuit and a common scan driver circuit is provided. The common data driver circuit includes a plurality of first switch groups, each first switch group being connected to the data lines of one of the display units for driving the data lines of the one of the display units. The common scan driver circuit includes a plurality of second switch group, each second switch group being connected to the scan lines of one of the display units for driving the scan lines of the one of the display units. Thus, the number of driver circuits is decreased.

BRIEF DESCRIPTION OF THE DRAWINGS

The present invention will be more clearly understood from the description set forth below, as compared with the prior art, with reference to the accompanying drawings, wherein:

FIGS. 22A and 22B are block circuit diagrams of the scan driver circuits of FIG. 21;

DESCRIPTION OF THE PREFERRED EMBODIMENTS

Before the description of the preferred embodiments, a prior art mobile telephone apparatus will be explained with reference to FIGS. 1A, 1B, 1C, 1D, 2 and 3.

Figure 1A:
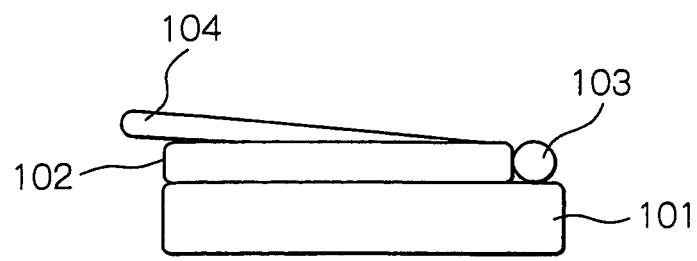
FIG. 1A is a side view illustrating a prior art mobile telephone apparatus which is closed.
Figure 1B:
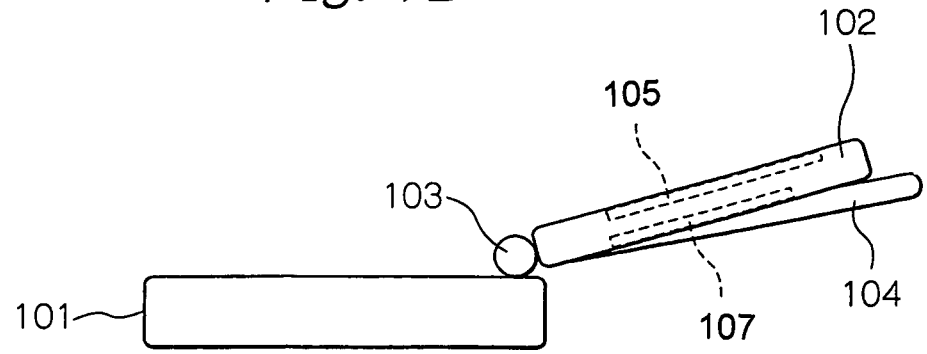
FIG. 1B is a side view of the mobile telephone apparatus of FIG. 1A which is opened.

FIG. 1A is a side view illustrating a prior art mobile telephone apparatus which is closed, and FIG. 1B is a side view illustrating the mobile telephone apparatus of FIG. 1A which is opened. In FIGS. 1A and 1B, reference numeral 101 designates a body to which a lid 102 is pivotably coupled by a butterfly hinge portion 103. Additionally, an antenna 104 for transmission and reception is slidably mounted in the lid 102.

Figure 1C:
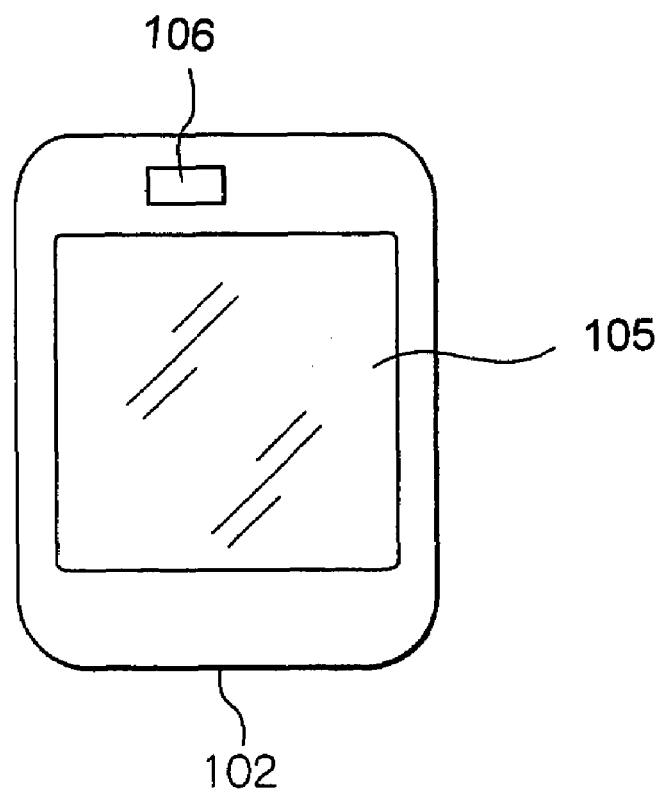
FIG. 1C is a plan view of the inner side of the main liquid crystal display (LCD) unit of FIGS. 1A and 1B.

Also, as illustrated in FIG. 1C, which is a plan view of the inner side of the lid 102 of FIGS. 1A and 1B, a main LCD unit 105 and a speaker 106 are provided on the inner side of the lid 102.

Figure 1D:
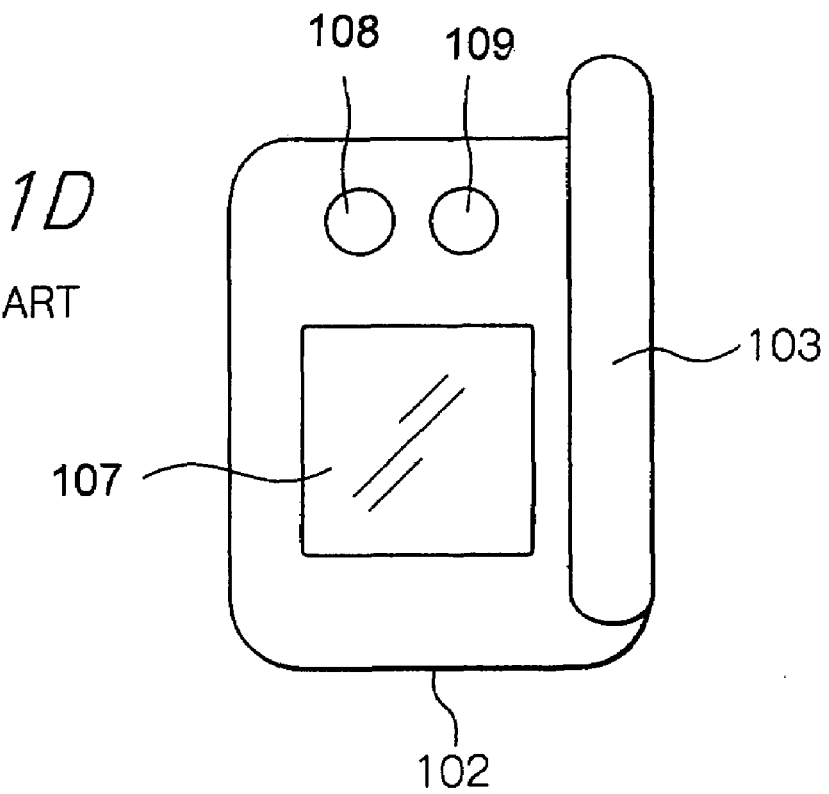
FIG. 1D is a plan view of the outer side of the sub LCD unit of FIGS. 1A and 1B.

Further, as illustrated in FIG. 1D, which is a plan view of the outer side of the lid 102 of FIGS. 1A and 1B, a sub LCD unit 107, a camera 108 and a light 109 are provided on the outer side of the lid 102 of FIGS. 1A and 1B.

In a stand-by mode, the lid 102 is closed as illustrated in FIG. 1A, to prepare for an incoming call. In this case, an antenna mark, a clock and a buttery residual mark are displayed on the sub LCD unit 107. On the other hand, in an operation mode, the lid 102 is opened as illustrated in FIG. 1B, while the main LCD unit 105 is operated.

A camera operation of the mobile telephone apparatus of FIGS. 1A, 1B, 1C and 1D is explained next.

For example, when an object is a person other than the user of the mobile telephone apparatus, the mobile telephone apparatus is opened as illustrated in FIG. 1B, so that the main LCD unit 105 is used as a finder while the camera 108 is facing the person. On the other hand, when an object is the user of the mobile telephone apparatus, the mobile telephone apparatus is closed as illustrated in FIG. 1A, so that the sub LCD unit 107 is used as a finder while the camera 108 is facing the user. As occasion demands, the light 109 is flashed.

Figure 2:
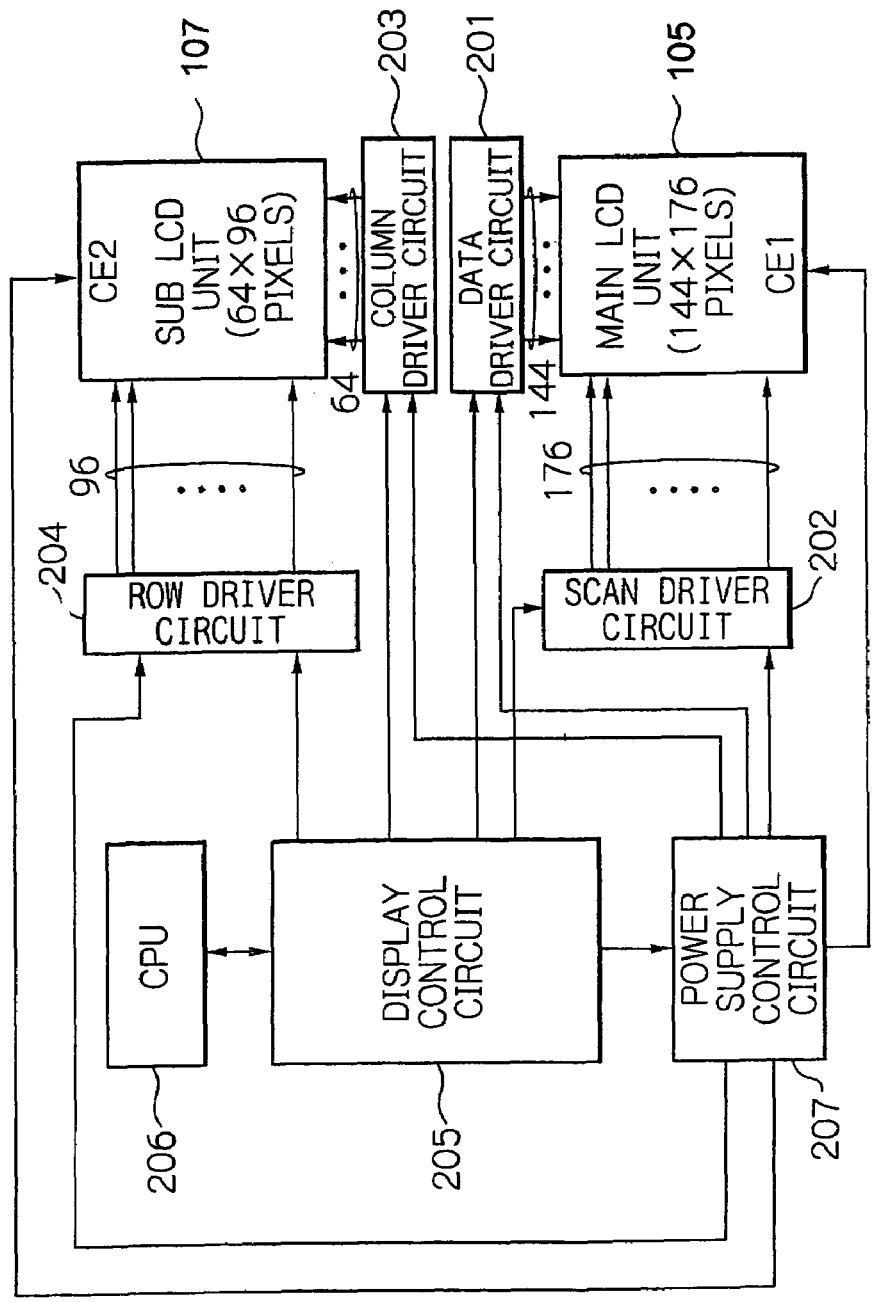
FIG. 2 is a block circuit diagram illustrating a first driving apparatus for driving the LCD units of FIGS. 1A, 1B, 1C and 1D.

In FIG. 2, which is a block circuit diagram of a first driving apparatus for driving the LCD units 105 and 107 of FIGS. 1A, 1B, 1C and 1D, the main LCD unit 105 is of a high quality thin film transistor (TFT)-type having 144×176 pixels which is expensive, and the sub LCD unit 107 is a low quality super twisted nematic (STN)-type LCD unit having 64×96 pixels which is inexpensive. The main LCD unit 105 is driven by a data driver circuit 201 and a scan driver circuit 202, while the sub LCD unit 107 is driver by a column driver circuit 203 and a row driver circuit 204. The data driver circuit 201, the scan driver circuit 202, the column driver circuit 203 and the row driver circuit 204 are controlled by a display control circuit 205 which is also controlled by a central processing unit (CPU) 206. The display control circuit 205 controls a power supply control circuit 207 which supplies power supply voltages to common electrode CE1 of the main LCD unit 105, a common electrode CE2 of the sub LCD unit 107, the data driver circuit 201, the scan driver circuit 202, the column driver circuit 203 and the row driver circuit 204.

In FIG. 2, if the sub LCD unit 107 is required to be a high quality, the sub LCD unit 107 can also be of a TFT-type LCD unit. In this case, the column driver circuit 203 and the row driver circuit 204 are replaced by another data driver circuit and another scan driver circuit, respectively.

In the driving apparatus of FIG. 2, however, since two driver circuits are provided for each of the main LCD unit 105 and the sub LCD unit 107, the driving apparatus of FIG. 2 is increased in size and in cost.

Figure 3:
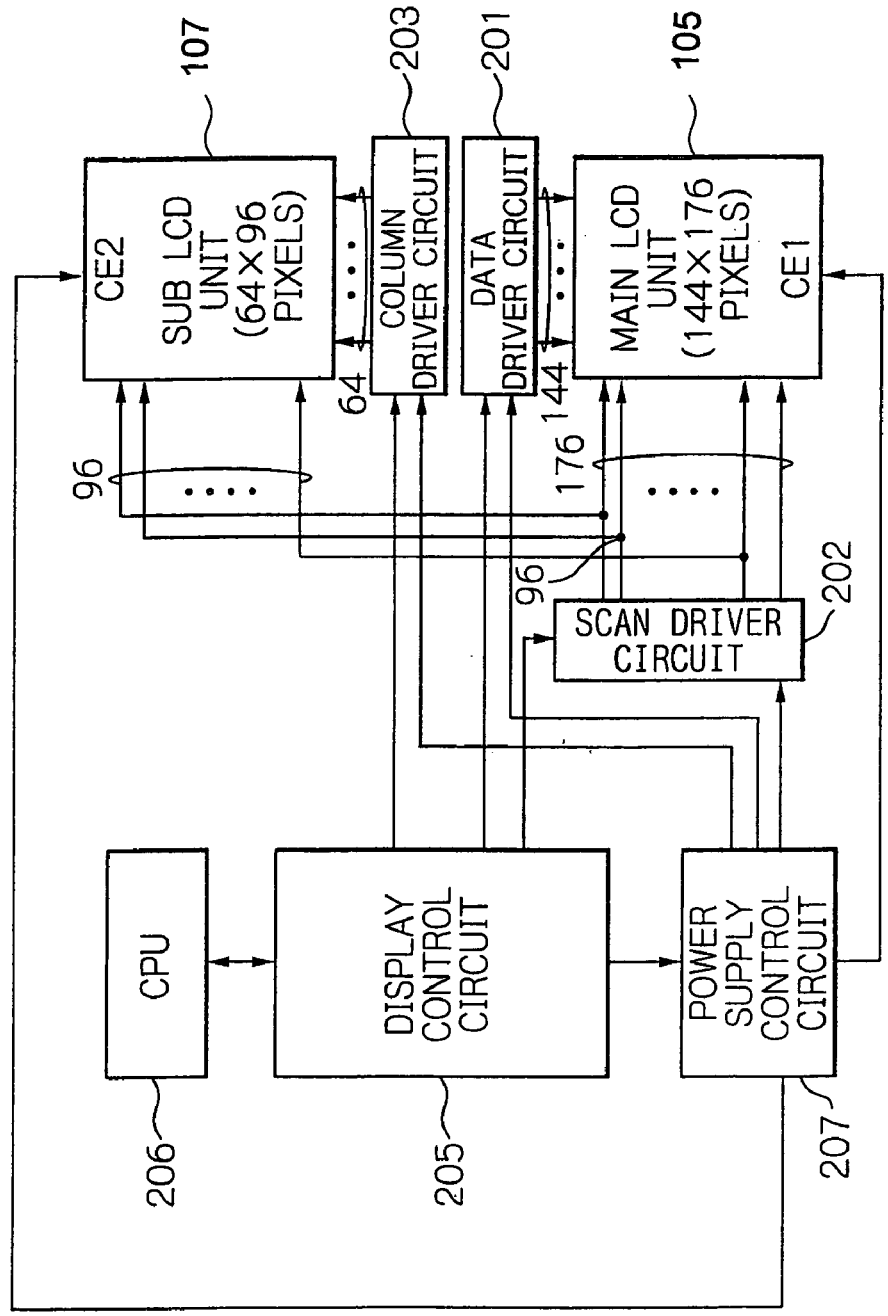
FIG. 3 is a block circuit diagram illustrating a second driving apparatus for driving the LCD units of FIGS. 1A, 1B, 1C and 1D.

In FIG. 3, which is a block circuit diagram of a second driving apparatus of FIGS. 1A, 1B, 1C and 1D, the main LCD unit 105 and the sub LCD unit 107 are both of a TFT-type. In this case, the scan lines of the sub LCD unit 107 are short-circuited to the corresponding scan lines of the main LCD unit 105, so that the row driver circuit 204 of FIG. 2 is omitted. Note that, if the data lines of the sub LCD unit 107 are short-circuited to the corresponding data lines of the main LCD unit 105, the column driver circuit 203 of FIG. 2 can be omitted.

In the driving apparatus of FIG. 3, since the number of driver circuits is decreased, the driving apparatus of FIG. 3 may be decreased in size and cost. However, since the parasitic capacitance of the scan lines or the parasitic capacitance of the data lines is substantially increased by the above-mentioned short-circuit, the power consumption is increased. Also, in order to drive the increased parasitic capacitance, large-sized drive transistors would be required, which increases the driving apparatus in size and in cost.

Figure 4:
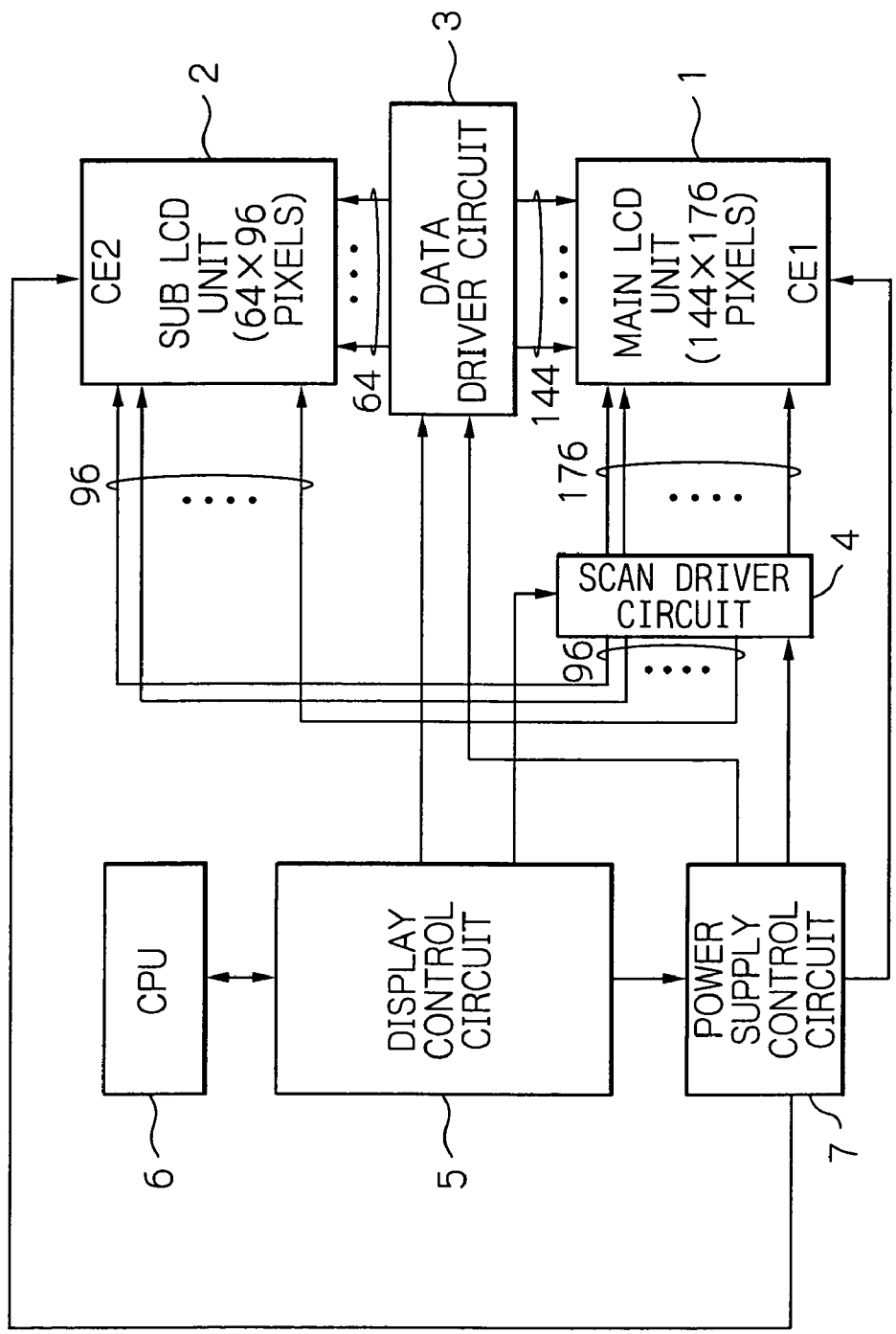
FIG. 4 is a block circuit diagram illustrating a first embodiment of the driving apparatus for driving a plurality of display units according to the present invention.

In FIG. 4, which illustrates a first embodiment of the driving apparatus for driving a plurality of display units according to the present invention, a TFT-type main LCD unit 1 constructed by 144×176 pixels connected to 144 data lines and 176 scan lines, and a TFT-type sub LCD unit 2 is constructed by 64×96 pixels connected to 64 data lines and 96 scan lines.

Note that, if the LCD units 1 and 2 are of a color type, the 144 data lines of the main LCD unit 1 are replaced by 432 (=144×3) data lines and the 64 data lines of the sub LCD unit 2 are replaced by 192 (=64×3) data lines. Note that the factor "3" designates the number of colors, i.e., red (R), blue (B) and green (G).

A data driver circuit 3 drives the 144 data lines of the main LCD unit 1 and the 64 data lines of the sub LCD unit 2. On the other hand, a scan driver circuit 4 drives the 176 scan lines of the main LCD unit 1 and the 96 scan lines of the sub LCD unit 2.

The data driver circuit 3 and the scan driver circuit 4 are controlled by a display control circuit 5 which is also controlled by a CPU 6.

The display control circuit 5 controls a power supply control circuit 7 which supplies power supply voltages to a common electrode CE1 of the main LCD unit 1, a common electrode CE2 of the sub LCD unit 2, the data driver circuit 3 and the scan driver circuit 4.

Figure 5:
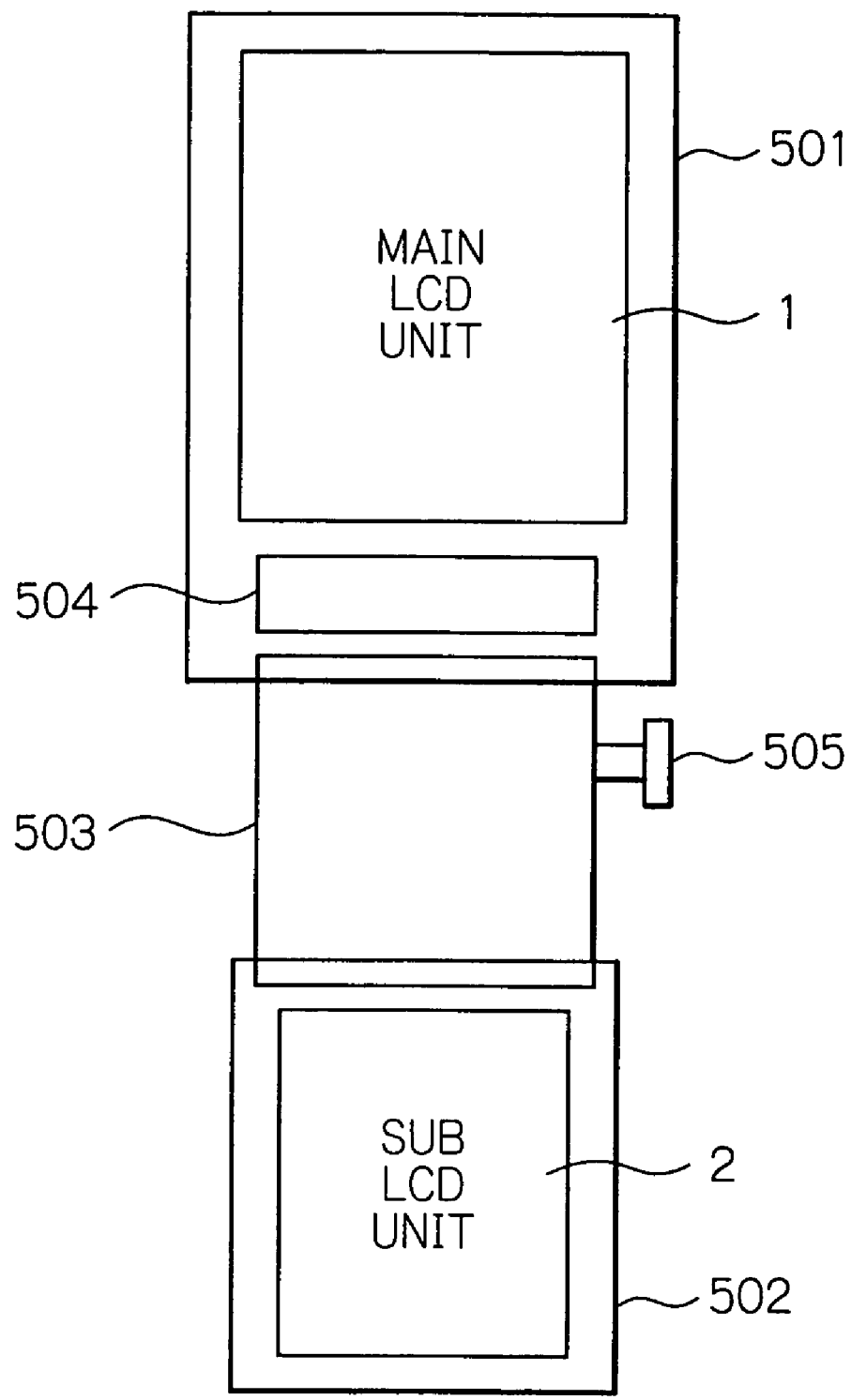
FIG. 5 is a diagram of a lid on which the driving apparatus of the FIG. 4 is mounted.
Figure 6:
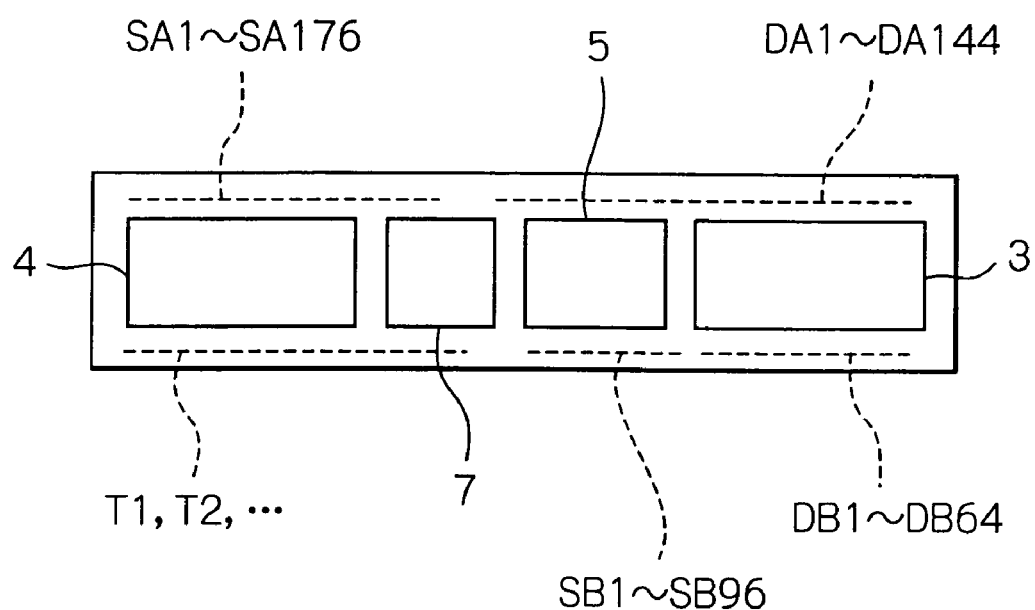
FIG. 6 is a layout diagram of the semiconductor integrated device of FIG. 5.

The driving apparatus of FIG. 4 except for the CPU 6 is mounted on the lid 102 of FIGS. 1A, 1B, 1C and 1D, as illustrated in FIG. 5. That is, the main LCD unit 1 is formed on a glass substrate 501, while the sub LCD unit 2 is formed on a glass substrate 502 which is connected by a flexible substrate 503 to the glass substrate 501. Also, an integrated circuit device 504 in which the data driver circuit 3, the scan driver circuit 4 and the display control circuit 5 are formed as illustrated in FIG. 6, is formed on the glass substrate 501. A connector 505 is mounted on the flexible substrate 503 and is connected to the CPU 6 mounted on the body 101 of FIGS. 1A, 1B, 1C and 1D.

In FIG. 6, DA1 to DA144 designate pads for the 144 data lines of the main LCD unit 1, and DB1 to DB64 designate pads for the 64 data lines of the sub LCD unit 2. Also, SA1, to SA176 designate pads for the 176 scan lines of the main LCD unit 1, and SB1 to SB96 designate pads for the 96 scan lines of the sub LCD unit 2. Also, T1, T2, . . . designate power supply control pads of the power supply circuit 7. Therefore, since the pads DA1 to DA144 and the pads SA1 to SA176 are adjacent to each other and located on the same side of the integrated circuit device 504, and the pads DB1 to DB64 and the pads SB1 to SB96 are adjacent to each other and located on the opposite side of the integrated circuit device 504, the connections between the pads DA1 to DA144 and SA1 to SA176 and the main LCD unit 1 never cross the connections between the pads DB1 to DB64 and SB1 to SB96 and the sub LCD unit 2. Also, that these connections can be as short as possible, thus decreasing the resistance thereof, particularly, when these connections are made of Cr whose resistance is larger than that of Al or Cu, the resistance of these connections is large, which can be compensated for by the above-mentioned configuration.

Note that the integrated circuit device 504 can be formed on the glass substrate 502 or the flexible substrate 503. Also, the data driver circuit 3, the scan driver circuit 4 and the display control circuit 5 and the power supply control circuit 7 can be individually formed on one semiconductor circuit device.

The data driver circuit 3 is explained next with reference to FIGS. 7, 8, 9, 10 and 11.

Figure 7:
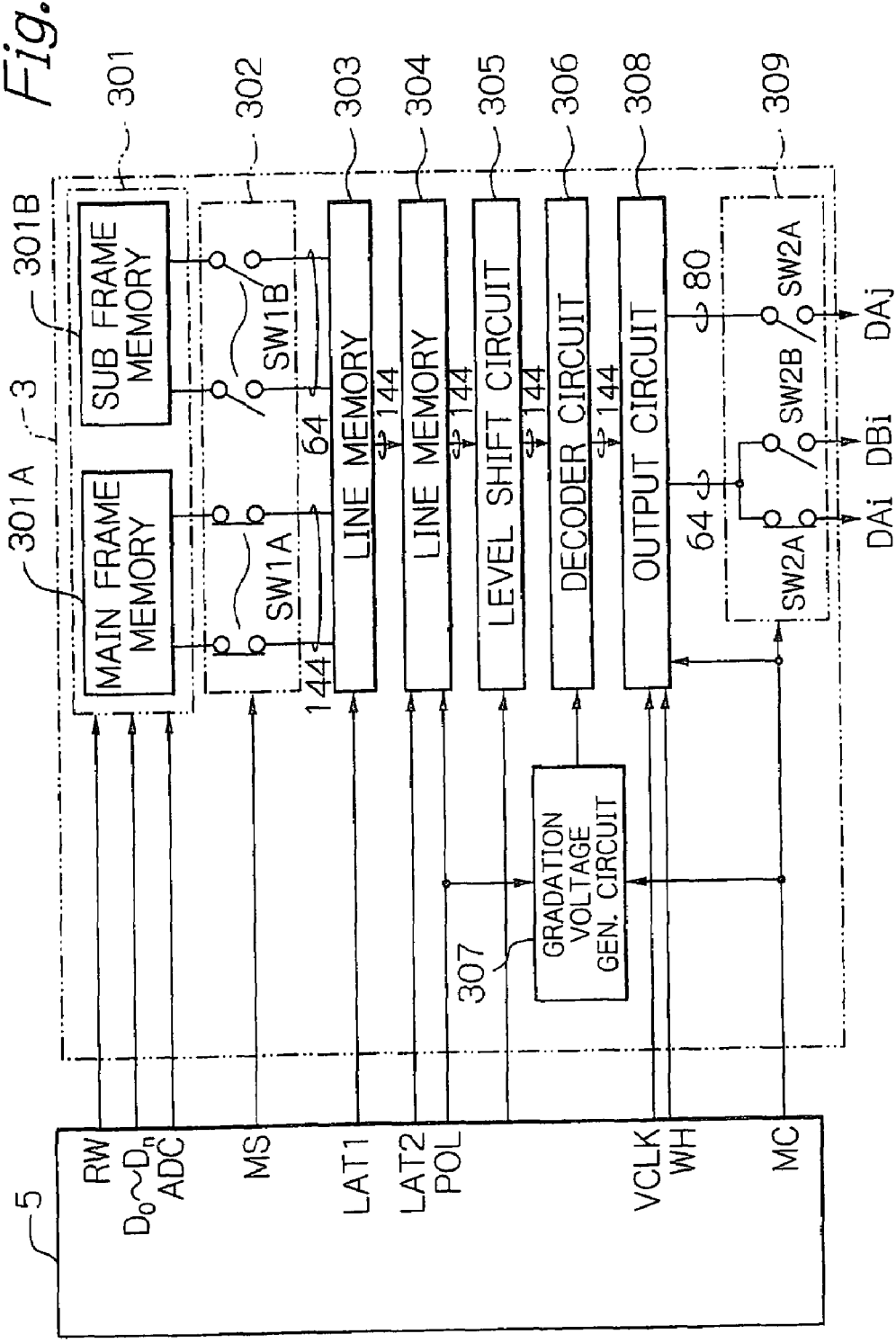
FIG. 7 is a detailed block circuit diagram of the data driver circuit of FIG. 4.

In FIG. 7, a frame memory 301 is formed by a main frame memory 301A for storing video signals for the main LCD unit 1 and a sub frame memory 301B for storing video signals for the sub LCD unit 2. The main frame memory 301A and the sub frame memory 301B are controlled by the display control circuit 5. That is, when a read/write signal RW indicates a write mode, data $D_o$ to $D_n$ are written into the main frame memory 301A or the sub frame memory 301B using an address control signal ADC (XY coordinates). On the other hand, when the read/write signal RW indicates a read mode, data is read from the main frame memory 301A or the sub frame memory 301B using the address control signal ADC.

A selection circuit 302 is constructed by 144 switches SW1A connected to the main frame memory 301A and 64 switches SW1B connected to the sub frame memory 301B. The switches SW1A and SW1B are controlled by a control signal MS from the display control circuit 5. For example, if the lid 102 is opened, the control signal MS is made "0" (low), so that the switches SW1A are turned ON and the switches SW1B are turned OFF. As a result, the one-line output data of the main frame memory 301A is latched in a line memory 303 in synchronization with a latch signal LAT1. On the other hand, if the lid 102 is closed, the control signal MS is made "1" (high), so that the switches SW1A are turned OFF and the switches SW1B are turned ON. As a result, the one-line output data of the sub frame memory 301B is latched in the line memory 303 in synchronization with the latch signal LAT1.

Then, the one-line data of the line memory 303 are latched in a line memory 304 in synchronization with a latch signal LAT2 from the display control circuit 5. In this case, the one-line polarities of the data of the line memory 303 are inverted in accordance with a polarity signal POL which is inverted at every horizontal synchronization period or vertical synchronization period.

A level shift circuit 305 performs a level shift operation upon the one-line data of the line memory 304 and transmits level-shifted one-line data to a decoder circuit 306. Note that the frame memory 301 and the line memories 303 and 304 are usually operated under a power supply voltage of 3V, while the decoder circuit 306, a gradation voltage generating circuit 307 and an output circuit 308 are operated under a power supply voltage of 4 to 5V. Therefore, a voltage level shift is required. However, if all the circuits are operated under the same power supply voltage, the level shift circuit 305 is unnecessary.

Figure 8:
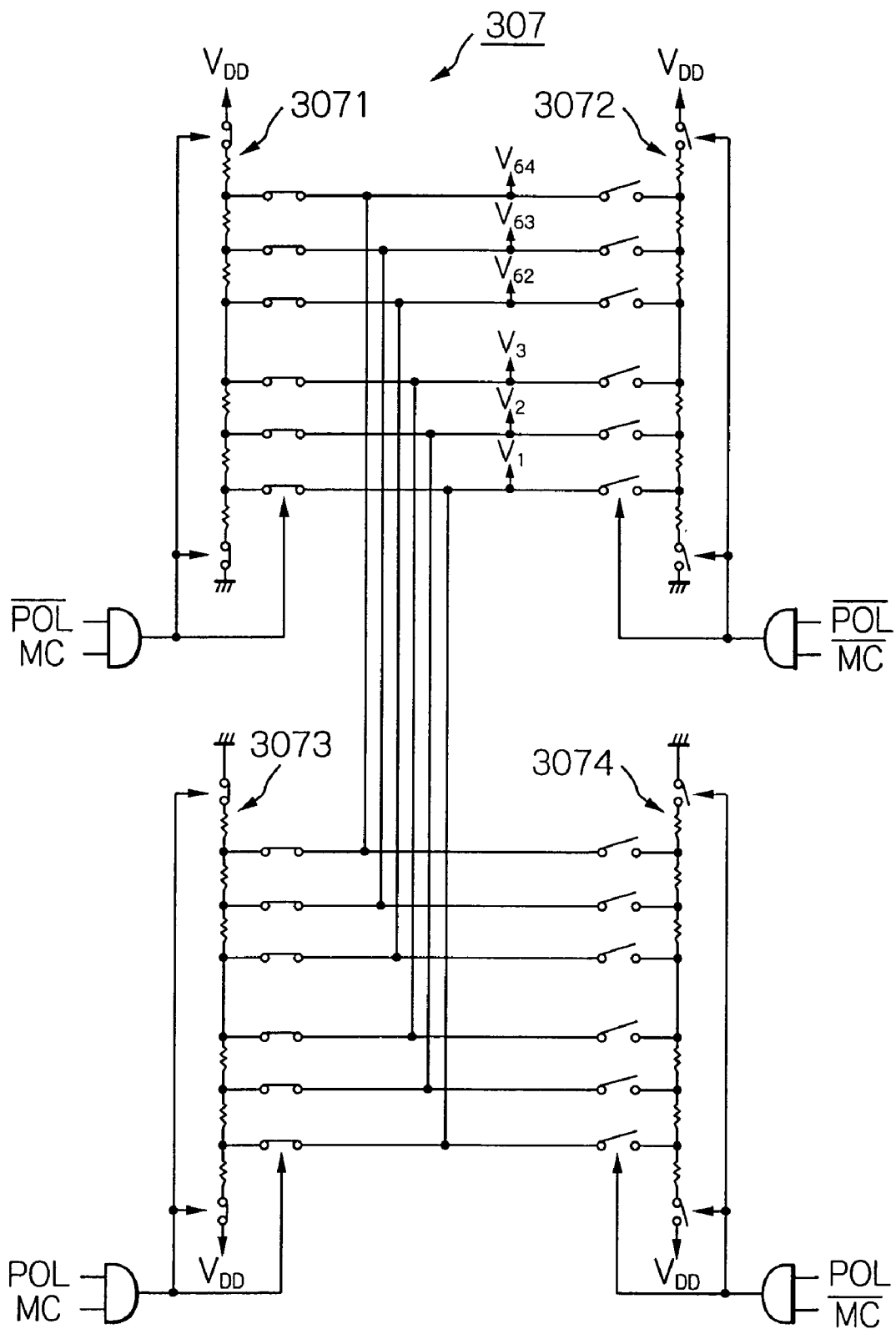
FIG. 8 is a detailed circuit diagram of the gradation voltage generating circuit of FIG. 7.

The decoder circuit 306 is constructed by a predetermined number of analog switches such as 64 analog switches for each data of the level shift circuit 305, provided that 64 gradation voltages are generated from the gradation voltage generating circuit 307 as illustrated in FIG. 8.

In FIG. 8, four voltage dividers 3071, 3072, 3073 and 3074 each having a series of resistors are provided. In this case, the voltage dividers 3071 and 3072 are used for a positive polarity operation (POL="0"), while the voltage dividers 3073 and 3074 are used for a negative operation (POL="1"). Also, the voltage dividers 3071 and 3073 are used for displaying the main LCD unit 1 (MC="0"), while the voltage dividers 3072 and 3074 are used for displaying the sub LCD unit 2 (MC="1"). Note that a control signal MC is in synchronization with the control signal MS and is delayed by one pulse of a vertical clock signal VCLK.

Returning to FIG. 7, gradation voltages selected by the decoder circuit 306 are supplied to the output circuit 308, and then are supplied via a selection circuit 309 to the main LCD unit 1 and the sub LCD unit 2.

Figure 9:
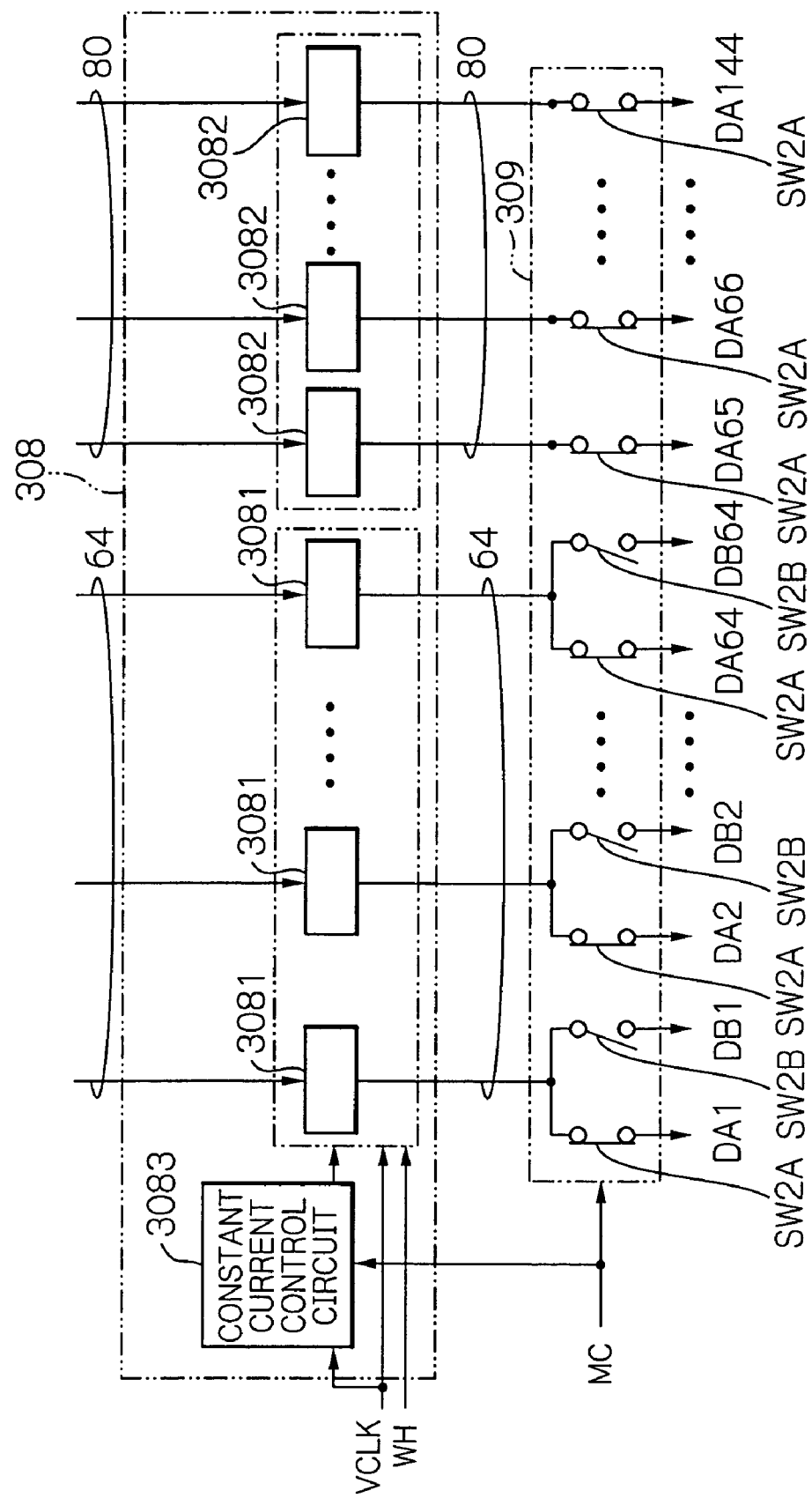
FIG. 9 is a detailed block circuit diagram of the output circuit and the selection circuit of FIG. 7.

In FIG. 9, which illustrates the output circuit 308 and the selection circuit 309 of FIG. 7, the output circuit 308 is constructed by 64 output circuits 3081 for driving the data lines DA1, DA2, . . . , DA64 of the main LCD unit 1 and the data lines DB1, D B2, . . . , DB64 of the sub LCD unit 2, 80 output circuits 3082 for driving the data lines DA65, DA66, . . . , DA144 of the main LCD unit 1, and a constant current control circuit 3083.

The constant current control circuit 3083 receives the control signal MC and the vertical clock signal VCLK from the display control circuit 5 to control the constant currents of the output circuits 3081 and 3082.

Also, in the selection circuit 309, when the control signal MC is "0" (low), the switches SW2A are turned ON and the switches SW2B are turned OFF, so that the main LCD unit 1 is operated. On the other hand, when the control signal MC is "1" (high), the switches SW2A are turned OFF and the switches SW2B are turned ON, so that the sub LCD unit 2 is operated.

Figure 10:
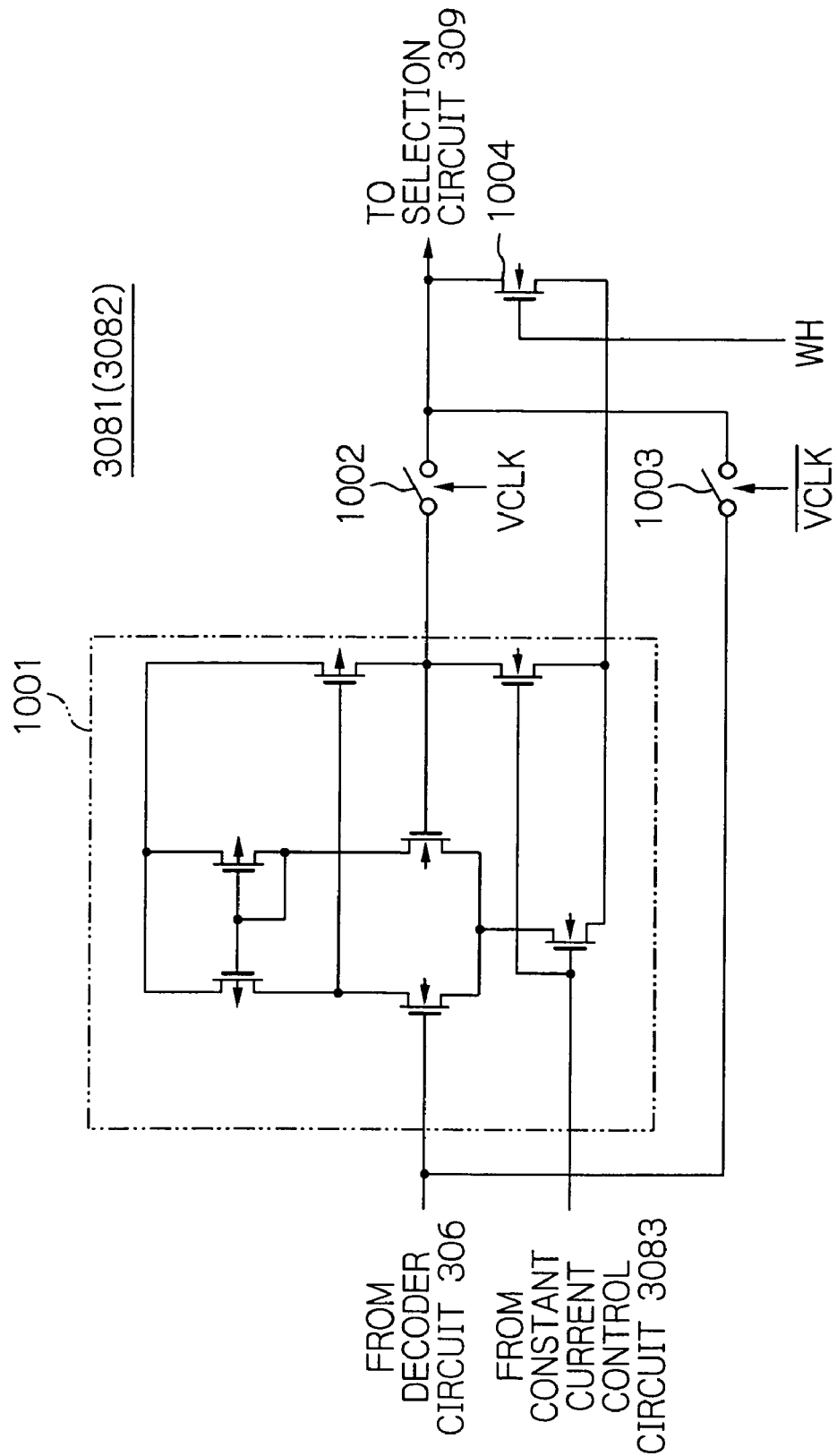
FIG. 10 is a detailed circuit diagram of the voltage follower of FIG. 9.
Figure 14:
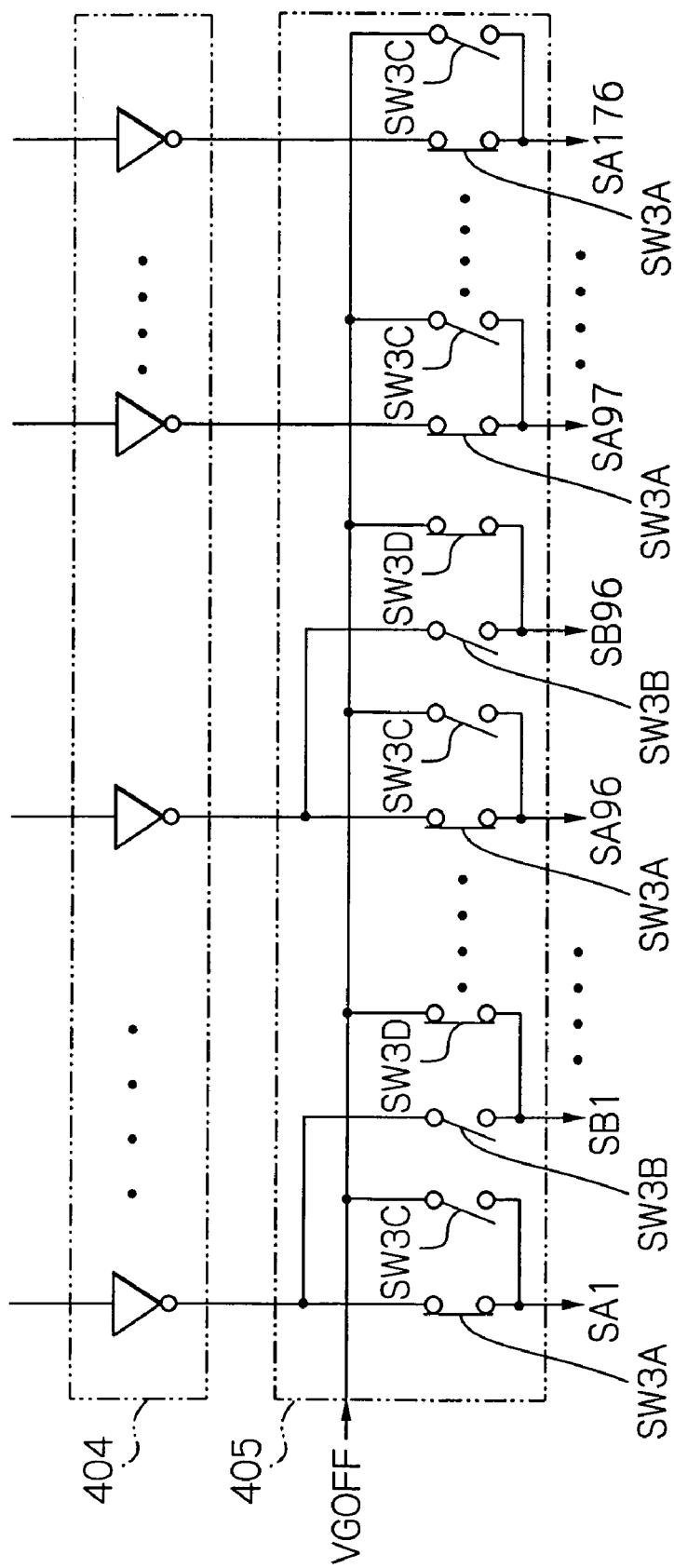
FIG. 14 is a detailed circuit diagram of a modification of the selection circuit of FIG. 13.

In FIG. 10, which illustrates the output circuit 3081 (3082) of FIG. 9, the output circuit 3081 (3082) is constructed by a voltage follower 1001 whose current sources are turned ON and OFF by the constant current control circuit 3083, a switch 1002 controlled by a high level of the vertical clock signal VCLK, a switch 1003 controlled by a low level of the vertical clock signal VCLK, and an N-channel MOS transistor 1004 controlled by a white signal WH. That is, when the vertical clock signal VCLK is high, the current source of the voltage follower 1001 is turned ON to amplify the selected gradation voltage, and simultaneously, the switches 1002 and 1003 are turned ON and OFF, respectively, to output the amplified selected gradation voltage. Then, after the operation of the voltage follower 1001 is stabilized, when the vertical clock signal VCLK is low, the current source of the voltage follower 1001 is turned OFF, and simultaneously the switches 1002 and 1003 are turned OFF and ON, respectively, so that the output signal of the decoder circuit 306 passes through the switch 1003 without passing through the voltage follower 1001. Thus, the power consumption is decreased (see: FIG. 14 of JP-A-2002-215108).

Also, when the N-channel MOS transistor 1004 is turned ON by the white signal WH, the charge of each data line is discharged, which stabilizes the operation of the LCD units 1 and 2.

Figure 11:
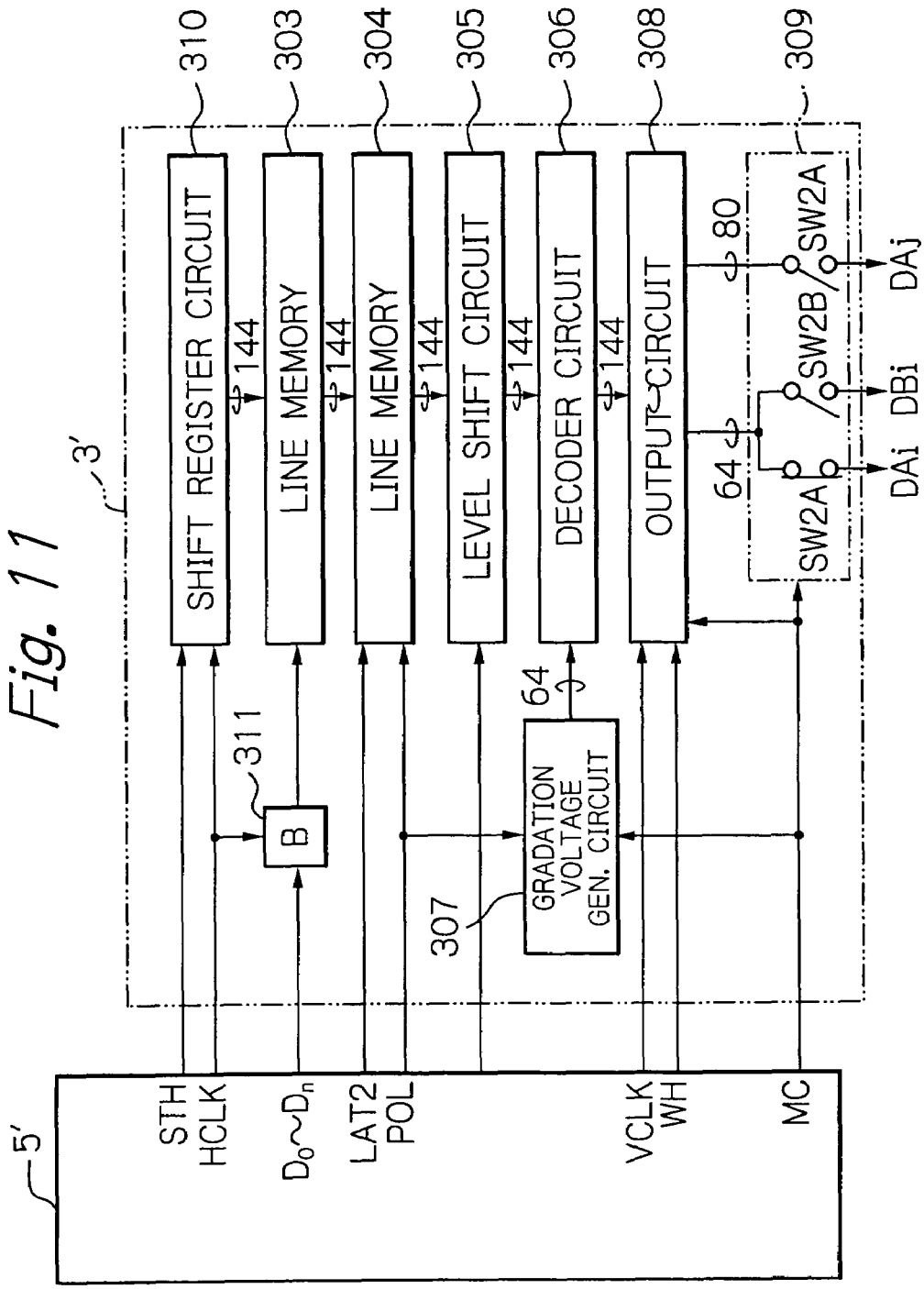
FIG. 11 is a block circuit diagram of a modification of the data driver circuit of FIG. 7.

In FIG. 11, which illustrates a modification of the data driver circuit of FIG. 7, a data driver circuit 3' is constructed by a shift register circuit 310 and a buffer 311 instead of the frame memory 301 and the selection circuit 302 of FIG. 7. The shift register circuit 310 shifts a start signal STH in synchronization with a horizontal clock signal HCLK which is generated from a display control circuit 5'. Also, video signals $D_0$ to $D_n$ from a display control circuit 5' are temporarily stored in the buffer 311 in synchronization with the horizontal clock signal HCLK, and then, are latched in the line memory 303 addressed by the shift register circuit 310.

In the driving apparatus using the data driver circuit 3' of FIG. 11, since the frame memory 301 is not provided, the burden on the CPU 6 would be increased.

The scan driver circuit 4 is explained next with reference to FIG. 12.

Figure 12:
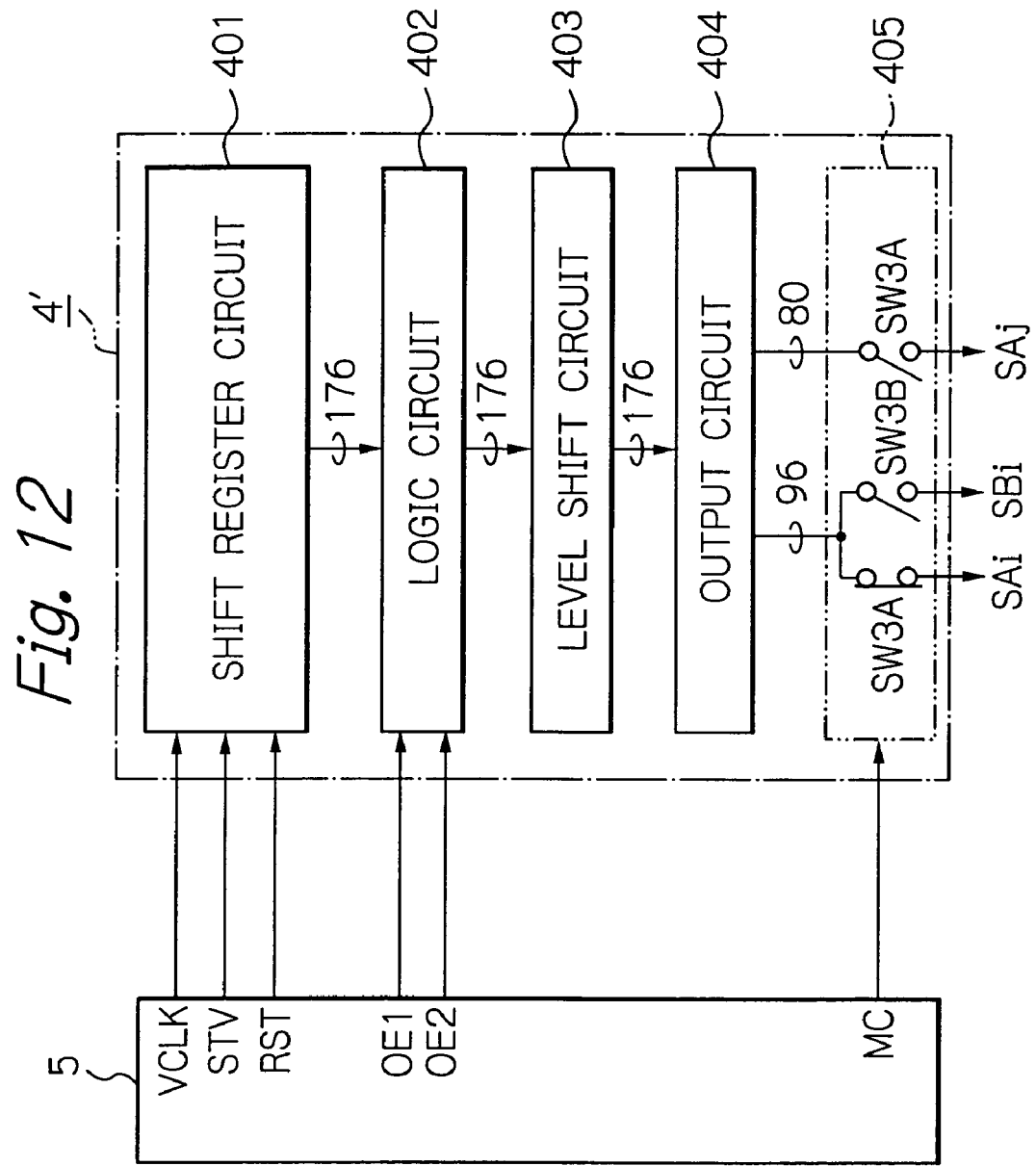
FIG. 12 is a block circuit diagram of the scan driver circuit of FIG. 4.

In FIG. 12, a shift register circuit 401 shifts a start signal STV in synchronization with a vertical clock signal VCLK which is generated from the display control circuit 5. Also, the shift register circuit 401 is reset by a reset signal RST from the display control circuit 5.

A logic circuit 402 receives output enable signals OE1 and OE2 from the display control circuit 5 to wave-shape output signals of the shift register circuit 401 so that the output signals are never superimposed onto each other.

A level shift circuit 403 performs a level shift operation upon the output signals of the logic circuit 402 and transmits level-shifted output signals data to an output circuit 404. Note that the shift register circuit 401 and the logic circuit 402 are usually operated under a power supply voltage of 3V, while the output circuit 404 is operated under a power supply voltage of 4 to 5V. Therefore, a voltage level shift is required. However, if all the circuits are operated under the same power supply voltage, the level shift circuit 403 is unnecessary.

Level-shifted output signals of the logic circuit 402 by the level shift circuit 403 are supplied to an output circuit 404, and then are supplied via a selection circuit 405 to the main LCD unit 1 and the sub LCD unit 2.

Figure 13:
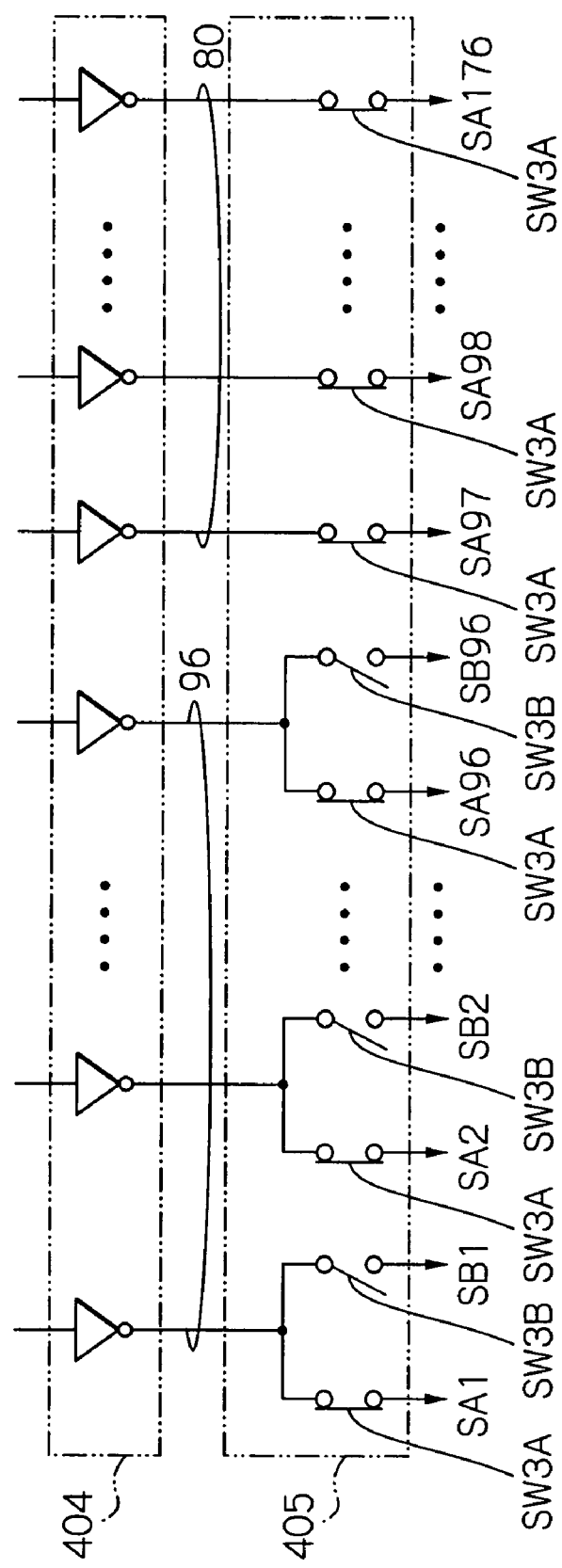
FIG. 13 is a detailed circuit diagram of the output circuit and the selection circuit of FIG. 12.

In FIG. 13, which illustrates the output circuit 404 and the selection circuit 405 of FIG. 12, the output circuit 404 is constructed by 176 inverters for driving the scan lines SA1, SA2, ..., SA176 of the main LCD unit 1 and the scan lines SB1, SB2, ..., SB96 of the sub LCD unit 2.

Also, in the selection circuit 405, when the control signal MC is "0" (low), the switches SW3A are turned ON and the switches SW3B are turned OFF, so that the main LCD unit 1 is operated. On the other hand, when the control signal MC is "1" (high), the switches SW3A are turned OFF and the switches SW3B are turned ON, so that the sub LCD unit 2 is operated.

In FIG. 14, which illustrates a modification of the selection circuit 405 of FIG. 13, switches SW3C are connected in parallel with the switches SW3A of FIG. 13 to cause the scan lines SA1, SA2, ..., SA176 to be at an off-level voltage VGOFF, and switches SW3D are connected in parallel with the switches SW3B of FIG. 13 to cause the scan lines SB1, SB2, ..., SB96 to be at an off-level voltage VGOFF. Note that the off-level voltage VGOFF is generated from the display control circuit 5 and is low enough to turn OFF the thin film transistors connected the corresponding scan lines.

For example, when the main LCD unit 1 is operated, the switches SW3D as well as the switches SW3A are turned ON and the switches SW3C as well as the switches SW3B are turned OFF. As a result, the scan lines SB1 to SB96 of the sub LCD unit 2 are surely made to be at the off-level voltage VGOFF, so that the sub LCD unit 2 is never operated by noise. On the other hand, when the sub LCD unit 2 is operated, the switches SW3C as well as the switches SW3B are turned ON and the switches SW3D as well as the switches SW3A are turned OFF. As a result, the scan lines SA1 to SA176 of the main LCD main 1 are surely made to be at the off-level voltage VGOFF, so that the main LCD unit 1 is never operated by noise.

The operation of the data driver circuit 3 and the scan driver circuit 4 of FIG. 4 is explained next with reference to FIGS. 15, 16, 17, 18 and 19.

Figure 15:
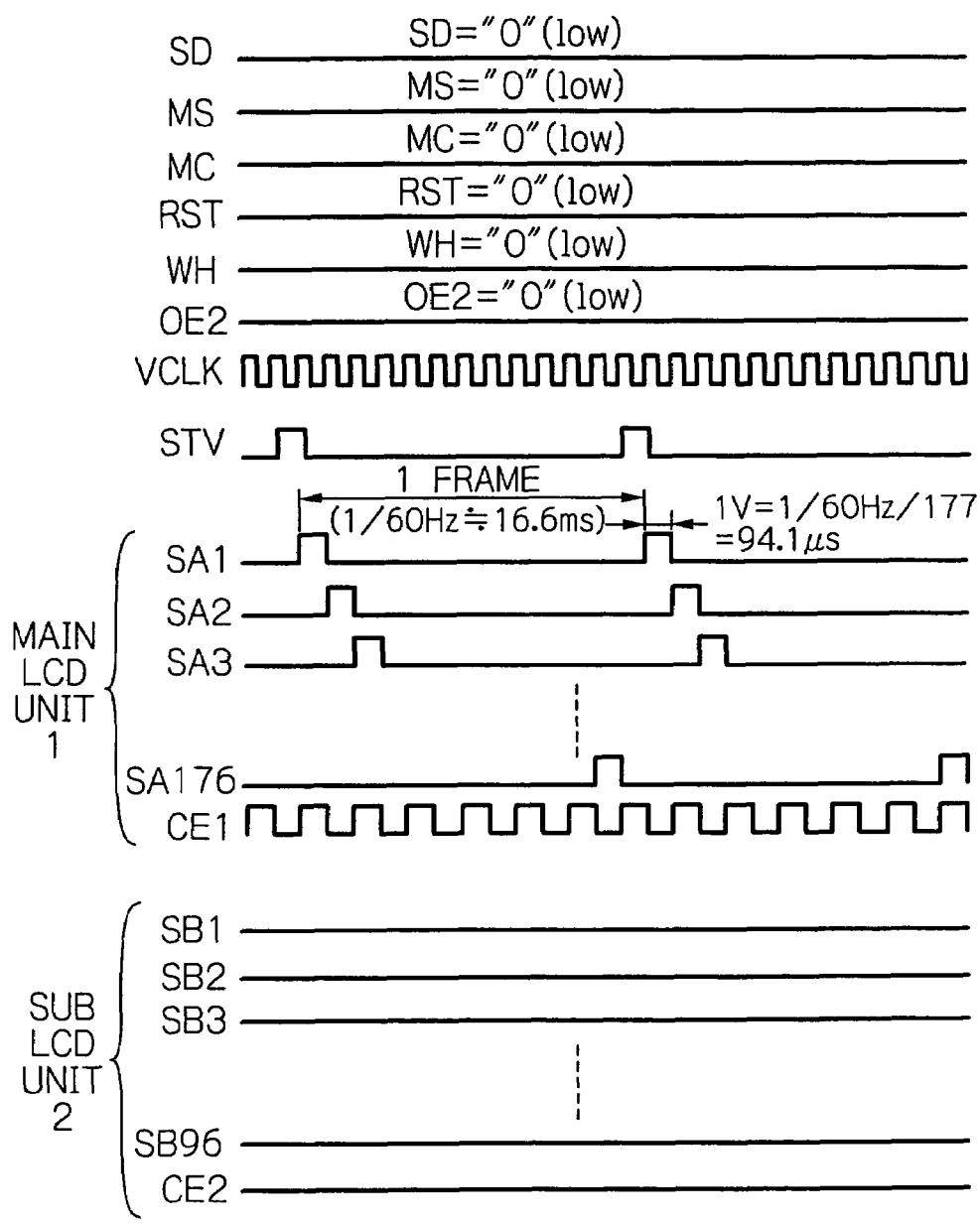
FIG. 15 through 19 are timing diagrams for explaining the operation of the data driver circuit and the scan driver circuit of FIG. 4.

In FIG. 15, which is a timing diagram where only the main LCD unit 1 is operated, a single/dual signal SD for indicating whether only one of the LCD units 1 and 2 is operated or both of the LCD units 1 and 2 are operated, is generated within the display control unit 5 by the CPU6. In this case, the signal SD is "0" (low), and the signals and MS and MC are both 0" (low). Also, the signals RST, WH and OE2 are 0" (low). Therefore, the switches SW1A and SW2A are turned ON and the switches SW1B and SW2B are turned OFF, so that the data lines DB1 to DB64 are in a high impedance state. On the other hand, the switches SW3A are turned ON and the switches SW3B are turned OFF, so that the scan lines SB1 to SB16 are in a non-operation mode. In this case, the common electrode CE1 of the main LCD unit 1 is in an operation mode, while the common electrode CE2 of the sub LCD unit 2 is in a non-operation mode. Thus, only the data lines DA1 to DA144 and the scan lines SA1 to SA176 are in an operation mode to drive the main LCD unit 1.

Figure 16:
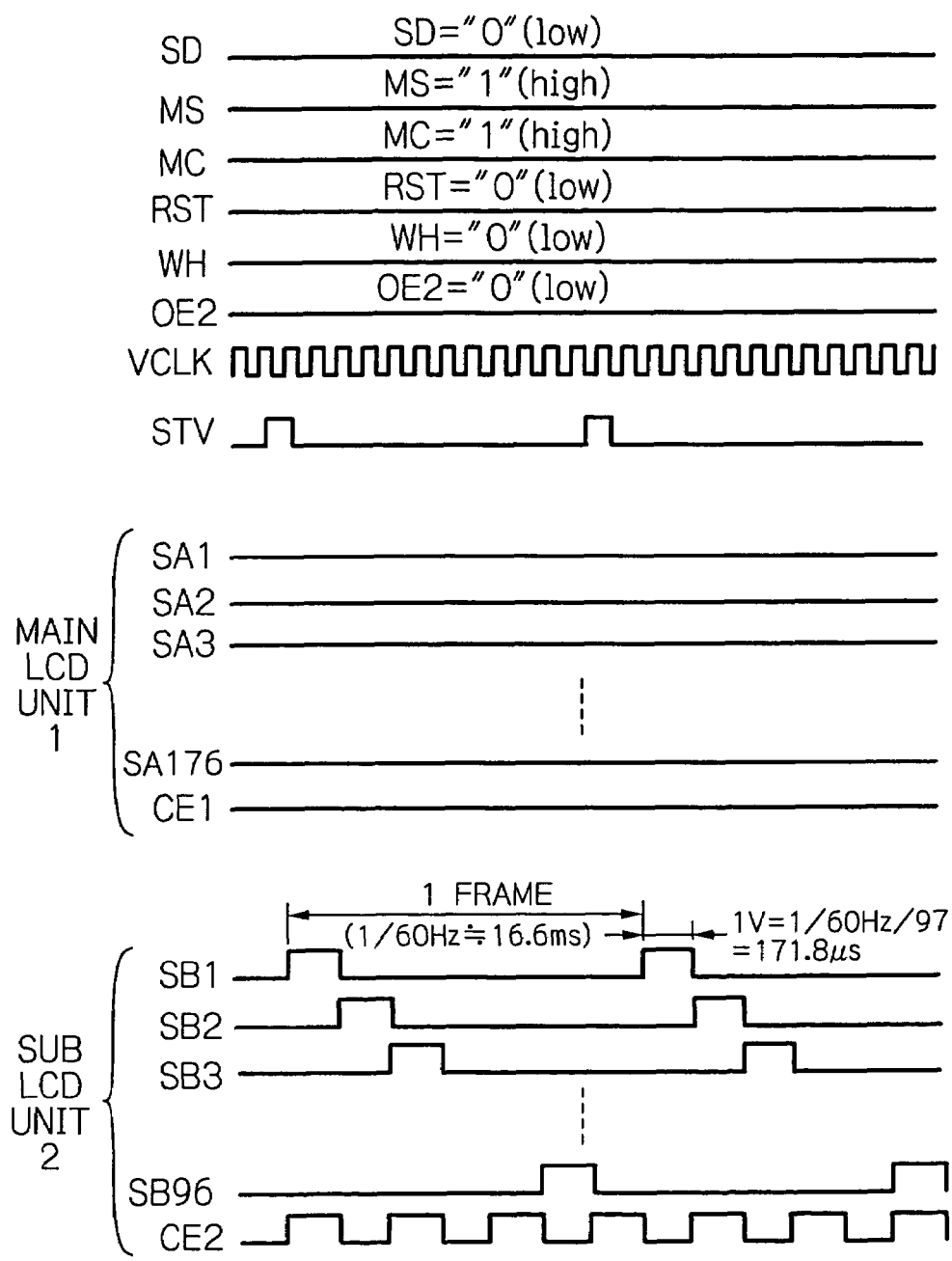

In FIG. 16, which is a timing diagram where only the sub LCD unit 2 is operated, the signal SD is "0" (low), and the signals MS and MC are both 1" (high). Also, the signals RST, WH and OE2 are 0" (low). Therefore, the switches SW1A and SW2A are turned OFF and the switches SW1B and SW2B are turned ON, so that the data lines DA1 to DA144 are in a high impedance state. On the other hand, the switches SW3A are turned OFF and the switches SW3B are turned ON, so that the scan lines SA1 to SA176 are in a non-operation mode. In this case, the common electrode CE2 of the sub LCD unit 2 is in an operation mode, while the common electrode CE1 of the main LCD unit 1 is in a non-operation mode. Thus, only the data lines DB1 to DB64 and the scan lines SB1 to SB96 are in an operation mode to drive the sub LCD unit 2.

Figure 17:
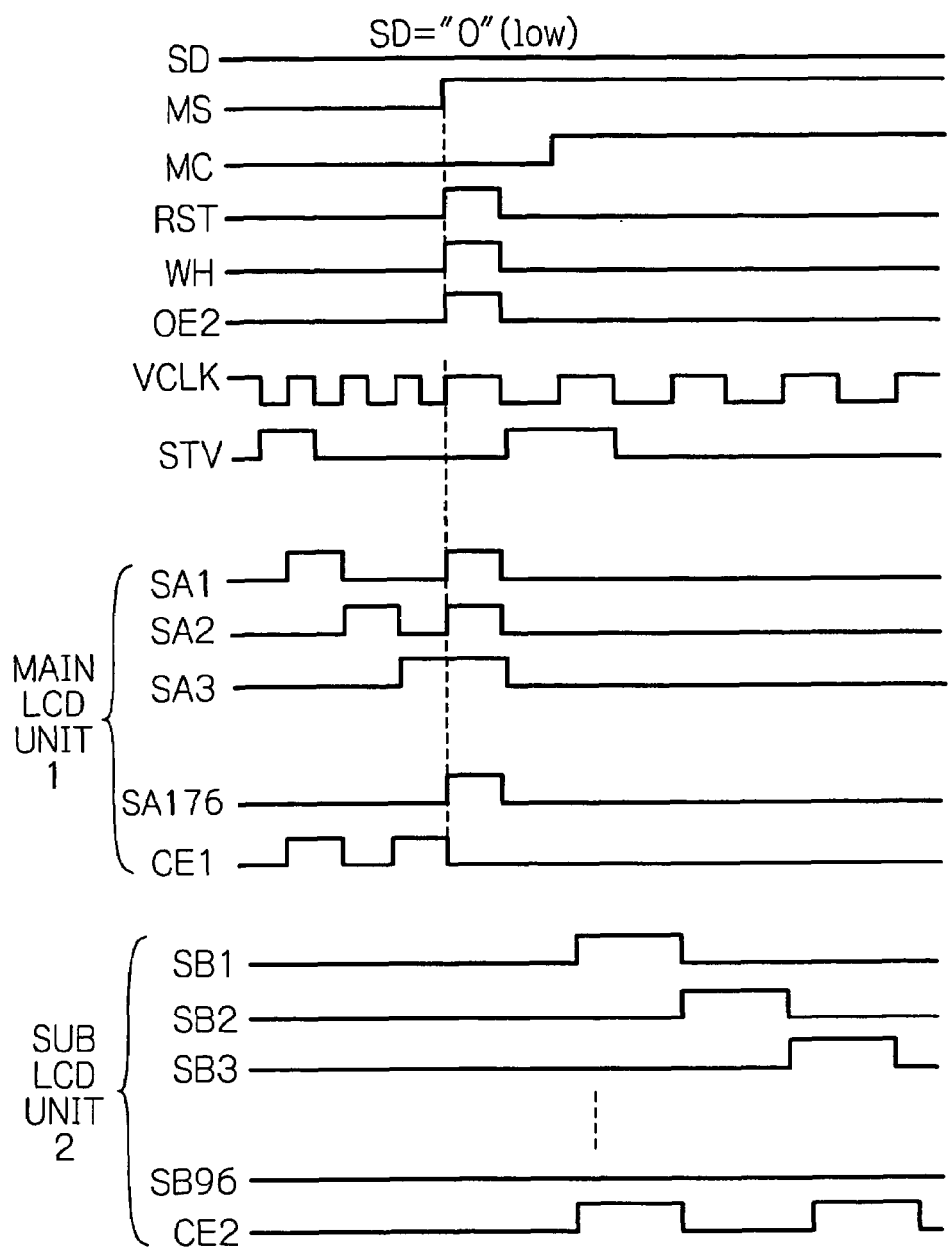

In FIG. 17, which is a timing diagram where the operation of the main LCD unit 1 is switched to the operation of the sub LCD unit 2, under the condition that SD is "0" (low), the signal MS is switched from "0" (low) to "1" (high) while the signals RST, WH and OE2 are made "1" (high) for a predetermined time period (=½ VCLK). As a result, all the data lines DA1 to DA144 of the main LCD unit 1 are grounded by the signal WH, and simultaneously, the scan lines SA1 to SA176 of the main LCD unit 1 are made "1" (high) by the signal OE2 to turn ON all the thin film transistors of the main LCD unit 1, so that all charges are removed from the main LCD unit 1. Thus, the main LCD unit 1 is at a white level provided that the main LCD unit 1 is of a normal white type. Thereafter, the signal MC is switched from "0" (low) to "1" (high), so as to turn ON the switches SW2B and SW3B, thus starting the operation of the sub LCD unit 2.

Figure 18:
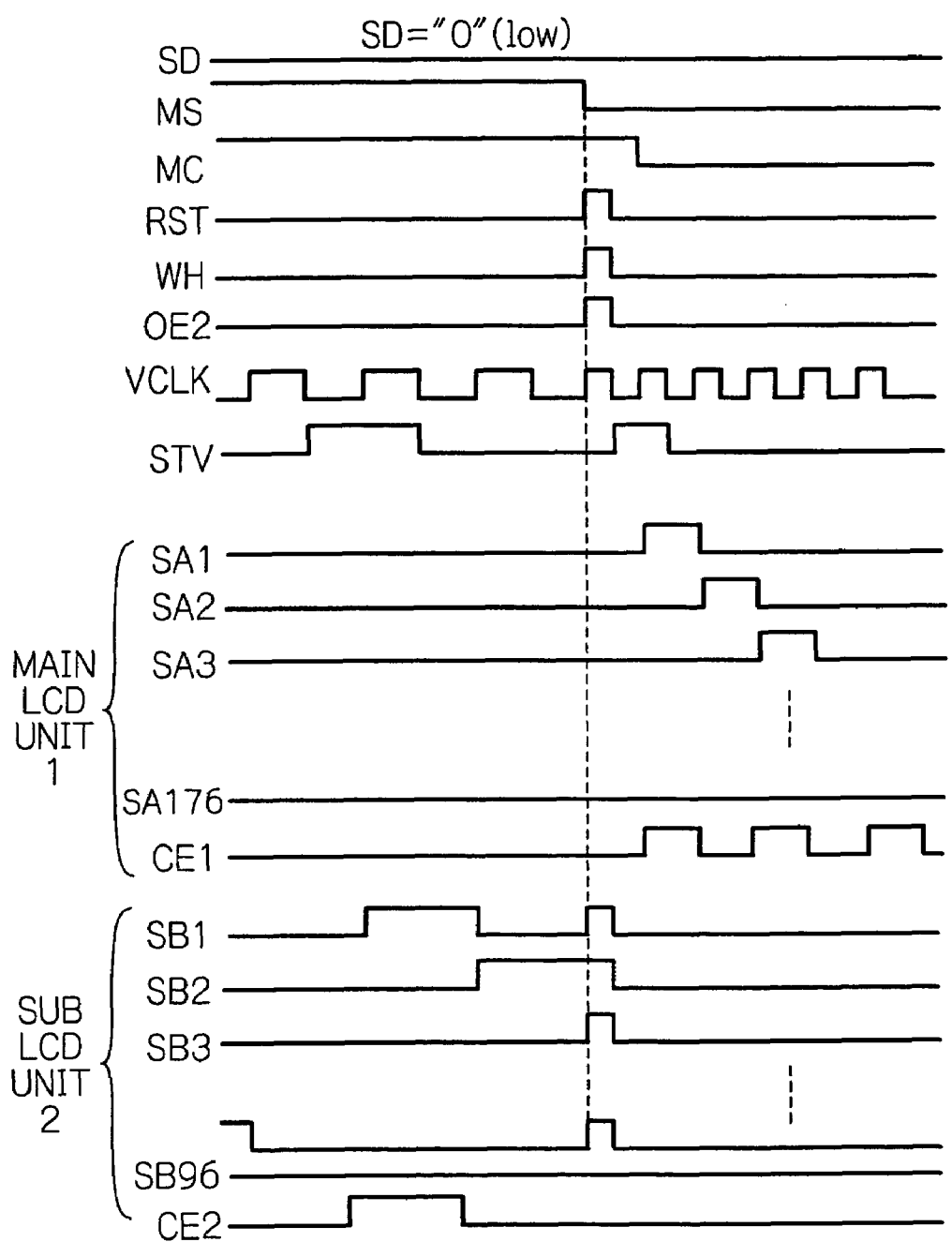

In FIG. 18, which is a timing diagram where the operation of the sub LCD unit 2 is switched to the operation of the main LCD unit 1, under the condition that SD is "0" (low), the signal MS is switched from "1" (high) to "0" (low) while the signals RST, WH and OE2 are made "1" (high) for a predetermined time period (=½ VCLK). As a result, all the data lines DB1 to DB64 of the sub LCD unit 2 are grounded by the signal WH, and simultaneously, the scan lines SB1 to SB96 of the sub LCD unit 2 are made "1" (high) by the signal OE2 to turn ON all the thin film transistors of the sub LCD unit 2, so that all charges are removed from the sub LCD unit 2. Thus, the sub LCD unit 1 is at a white level provided that the sub LCD unit 2 is of a normal white type. Thereafter, the signal MC is switched from "1" (high) to "0" (low), so as to turn ON the switches SW2A and SW3A, thus starting the operation of the main LCD unit 1.

Thus, as illustrated in FIGS. 17 and 18, when the operation of the main LCD unit 1 is switched to the operation of the sub LCD unit 2 or vice versa, one of the main LCD unit 1 and the sub LCD unit 2 which is previously operated is at a white level provided that it is of a normal white type, so that the residual image thereof can be completely removed, which is very helpful in a reflection type LCD unit or a semi-reflection type LCD unit.

Figure 19:
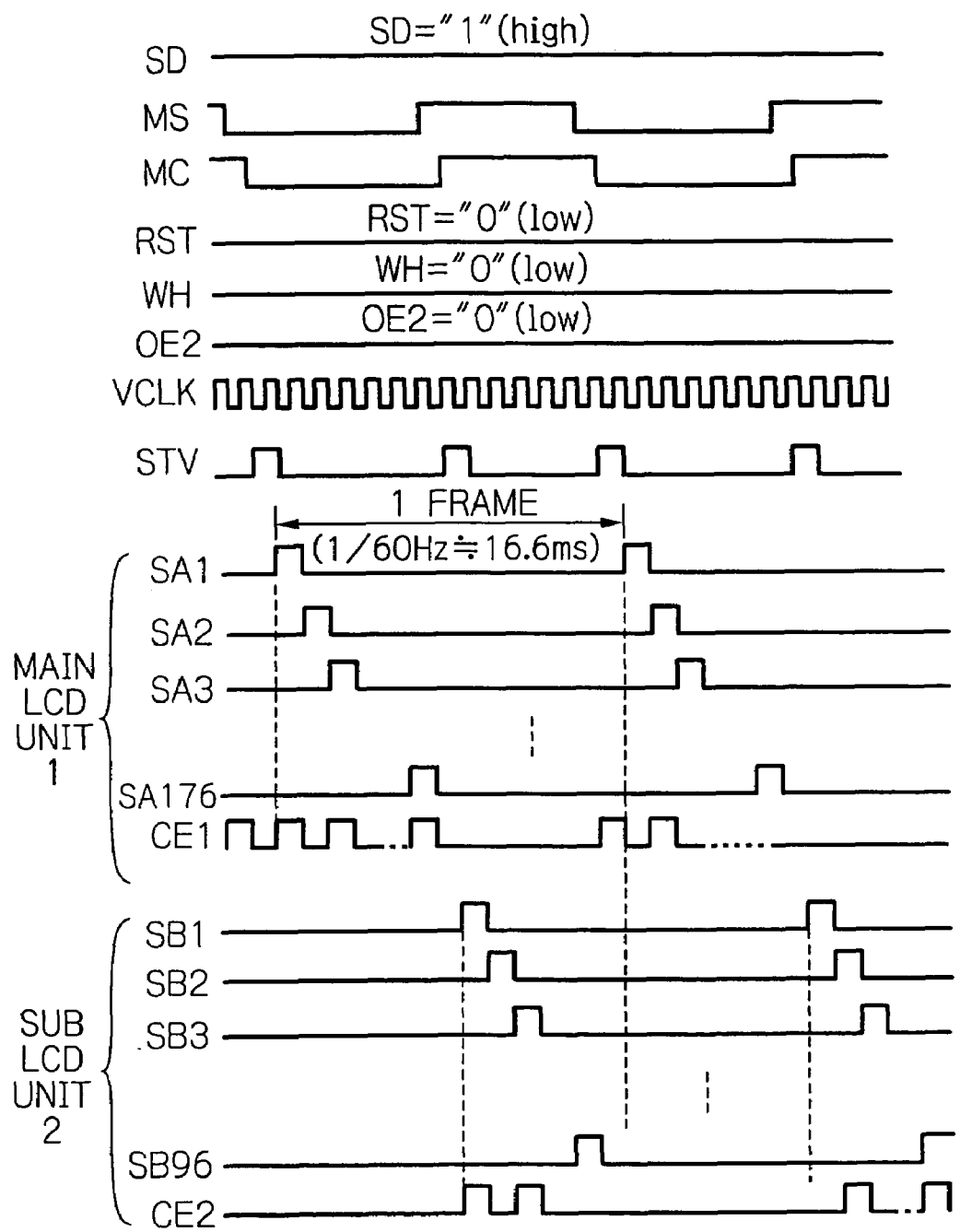

In FIG. 19, which is a timing diagram where the main LCD unit 1 and the sub LCD unit 2 are both operated, the signal SD is "1" (high). In this case, while the signals RST, WH and OE2 are "0" (low), the signals MS and MC are switched twice during one frame period. As a result, the main LCD unit 1 and the sub LCD unit 2 are repeatedly driven during one frame period.

Figure 20:
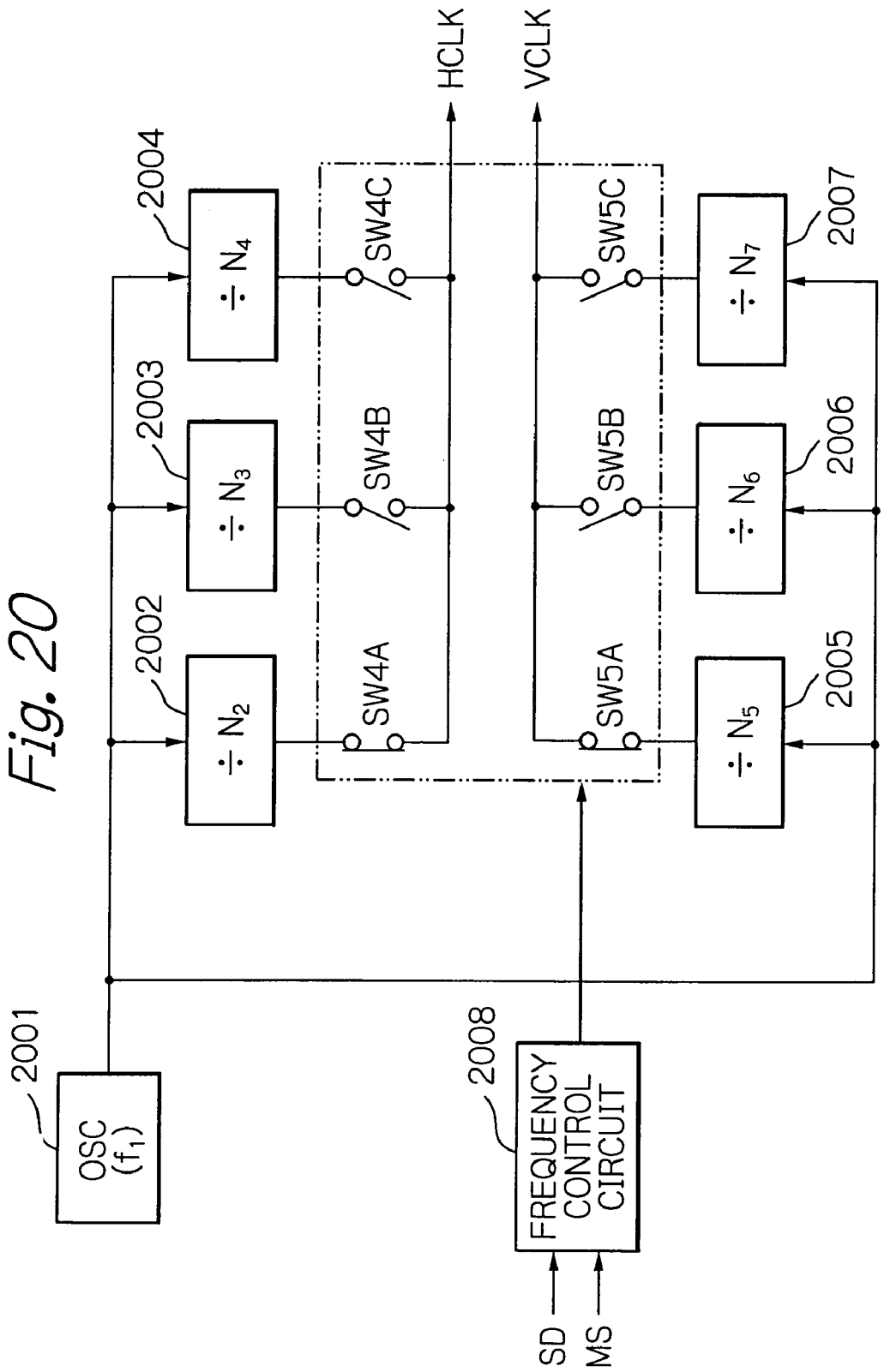
FIG. 20 is a block circuit diagram of the clock generating circuit incorporated into the display control circuit of FIG. 4.

As illustrated in FIGS. 15 through 19, even if the number of pixels of the main LCD unit 1 is different from that of the sub LCD unit 2, the frame frequency of the main LCD unit 1 is the same as that of the sub LCD unit 2. Additionally, even if the main LCD unit 1 and the sub LCD unit 2 are both operated, the frame frequency thereof is the same as the above-mentioned frame frequency. For realizing this, a clock generating circuit as illustrated in FIG. 20 is incorporated into the display control circuit 5. In other words, the frequency of the horizontal clock signal HCLK for the data driver circuit 3 and the frequency of the vertical clock signal HCLK for the scan driver circuit 4 are changed, so that the frame frequency is brought close to a definite value such as 60 Hz.

In FIG. 20, an oscillator 2001 generates a signal having a frequency $f_1$ and transmits it to frequency dividers 2002, 2003, 2004, 2005, 2006 and 2007. The frequency dividers 2002, 2003, and 2004 have dividing ratios $N_2$, $N_3$ and $N_4$ corresponding to the number of data lines to satisfy the following:

$f_1/N_2 = 60\ Hz \times 177 \times 144 \approx 1500\ kHz$ $f_1/N_3 = 60\ Hz \times 97 \times 64 \approx 372\ kHz$ $f_1/N_4 = 60\ Hz \times (177+97) \times (144+64) \approx 3420\ kHz$ These formulae are true even if the LCD units 1 and 2 are of a color type, since every three data lines are simultaneously driven. On the other hand, the frequency dividers 2005, 2006 and 2007 have dividing ratios $N_5$, $N_6$ and $N_7$ corresponding to the number of scan lines to satisfy the following:

$f_1/N_5 = 60\ Hz \times 177 \approx 10.6\ kHz$ $f_1/N_6 = 60\ Hz \times 97 \approx 5.8\ kHz$ $f_1/N_7 = 60\ Hz \times (177+97) \approx 16.4\ kHz$ The frequency $f_1$ and the dividing ratios $N_2$, $N_3$, $N_4$, $N_5$, $N_6$ and $N_7$ are predetermined to satisfy the above-mentioned six formulae, provided that the dividing ratios $N_2$, $N_3$, $N_4$, $N_5$, $N_6$ and $N_7$ are positive integers. However, the frequency $f_1$ is actually very large to completely satisfy the above-mentioned six formulae. Therefore, in order to substantially decrease the frequency $f_1$, the values of 1500 kHz, 372 kHz, 3420 kHz, 10.6 kHz, 5.8 kHz and 16.4 kHz are approximated to 1500 kHz, 400 kHz, 3400 kHz, 10 kHz, 5 kHz and 20 kHz, respectively, so that the above-mentioned six formulae are replaced by $f_1/N_2 = 1500\ kHz$
$f_1/N_3 = 500\ kHz$
$f_1/N_4 = 3000\ kHz$
$f_1/N_5 = 10\ kHz$
$f_1/N_6 = 5\ kHz$
$f_1/N_7 = 20\ kHz$ In this case, the following is satisfied:
$N_2 = 2$
$N_3 = 6$
$N_4 = 1$
$N_5 = 300$
$N_6 = 600$
$N_7 = 150$
$f_1 = 3000\ kHz$ As a result, the frequency dividers 2002, 2003 and 2004 generate signals having frequencies 1500 kHz, 500 kHz and 3000 kHz, respectively. On the other hand, the frequency dividers 2005, 2006 and 2007 generate signals having frequencies 10 kHz, 5 kHz and 20 kHz, respectively.

The frequency dividers 2002, 2003, 2004, 2005 and 2007 are connected to switches SW4A, SW4B, SW4C, SW5B and SW5C, respectively. The switches SW4A, SW4B, SW4C, SW5A, SW5B and SW5C are controlled by a frequency control circuit 2008 which receives the single/dual signal SD and the signal MC. That is, when SD="0" (low) and MC="0" (low), the switches SW4A and SW5A are turned ON so that the horizontal clock signal HCLK and the vertical clock signal VCLK have frequencies of 1500 kHz and 10 kHz, respectively, thus driving only the main LCD unit 1. Also, when SD="0" (low) and MC="1" (high), the switches SW4B and SW5B are turned ON so that the horizontal clock signal HCLK and the vertical clock signal VCLK have frequencies of 500 kHz and 5 kHz, respectively, thus driving only the sub LCD unit 2. Further, when SD="1" (high), the switches SW4C and SW5C are turned ON so that the horizontal clock signal HCLK and the vertical clock signal VCLK have frequencies of 3000 kHz and 20 kHz, respectively, thus simultaneously driving the main LCD unit 1 and the sub LCD unit 2.

Thus, in the driving apparatus of FIG. 4, since the data driver circuit 3 and the scan driver circuit 4 are provided in common for the main LCD unit 1 and the sub LCD unit 2, the apparatus can be decreased in size and in cost without increasing the power consumption.

Figure 21:
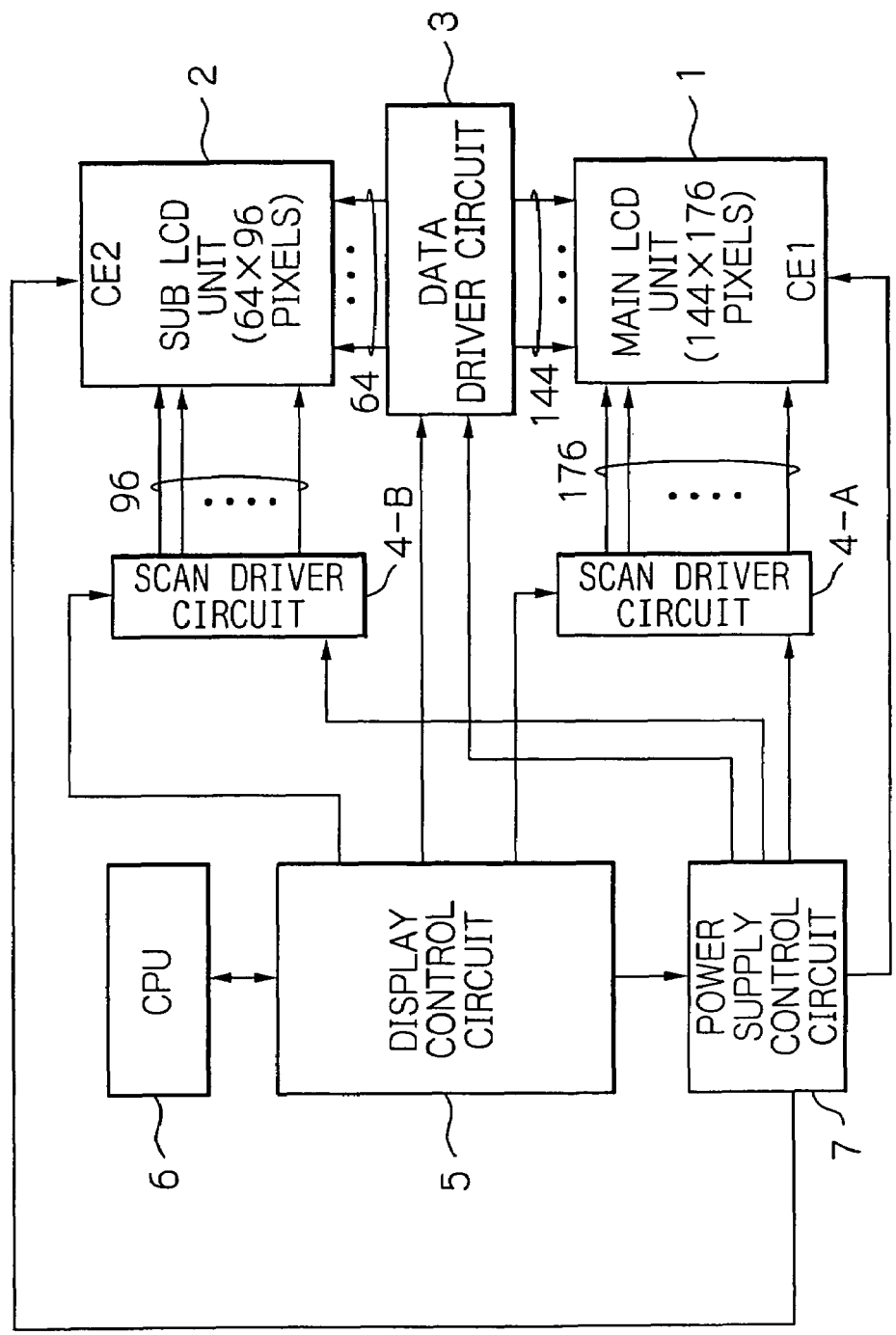
FIG. 21 is a block circuit diagram illustrating a second embodiment of the driving apparatus for driving a plurality of display units according to the present invention.

In FIG. 21, which illustrates a second embodiment of the driving apparatus for driving a plurality of display units according to the present invention, although the data driver circuit 3 is provided commonly for the main LCD unit 1 and the sub LCD unit 2, scan driver circuits 4-A and 4-B are provided individually for the main LCD unit 1 and the sub LCD unit 2. In this case, the scan driver circuits 4-A and 4-B are illustrated in FIGS. 22A and 22B, respectively.

Even in the driving apparatus of FIG. 21, since the data driver circuit 3 is provided in common for the main LCD unit 1 and the sub LCD unit 2, the apparatus can be decreased in size and in cost without increasing the power consumption.

Figure 23:
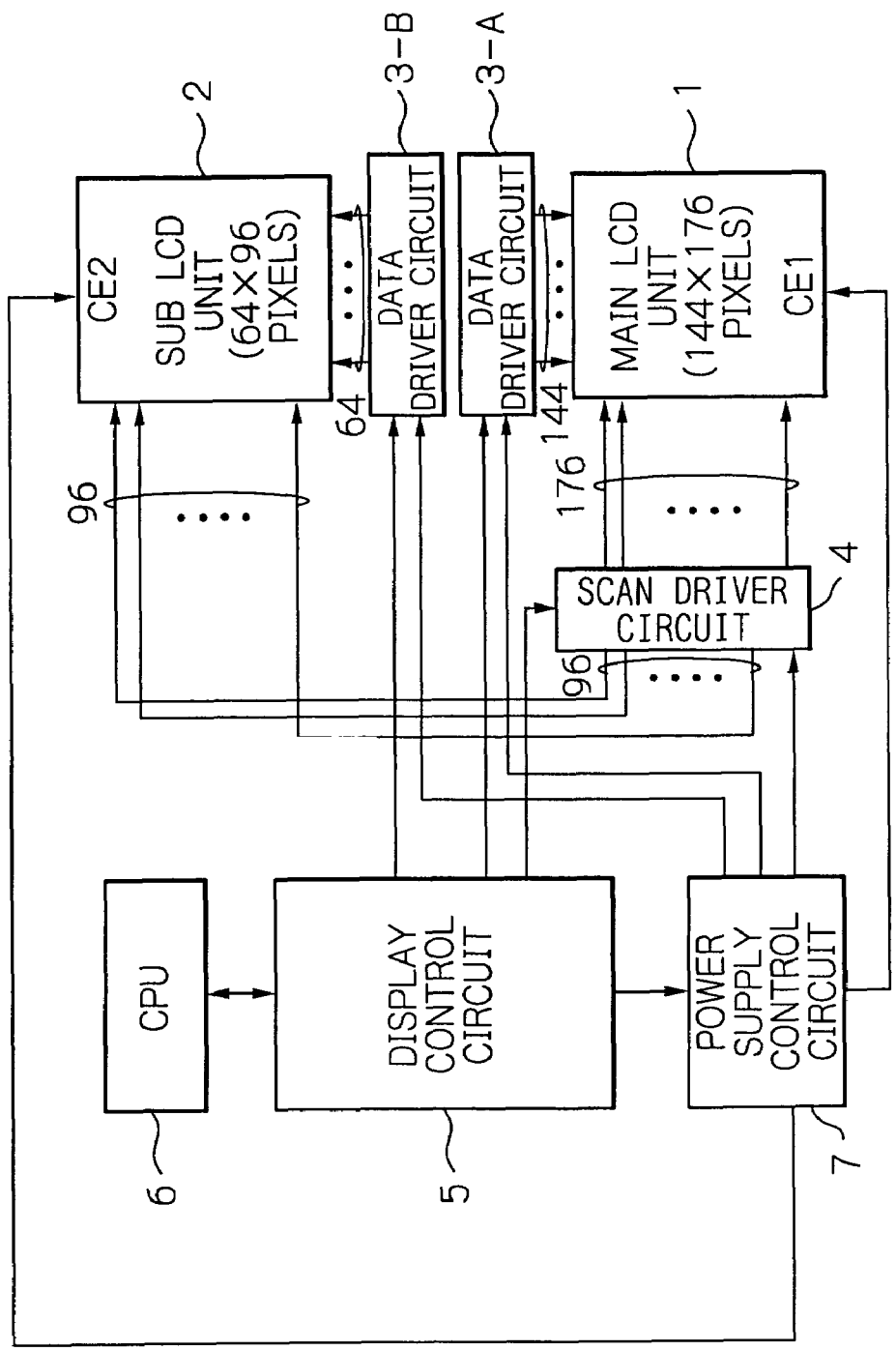
FIG. 23 is a block circuit diagram illustrating a third embodiment of the driving apparatus for driving a plurality of display units according to the present invention.
Figure 24A:
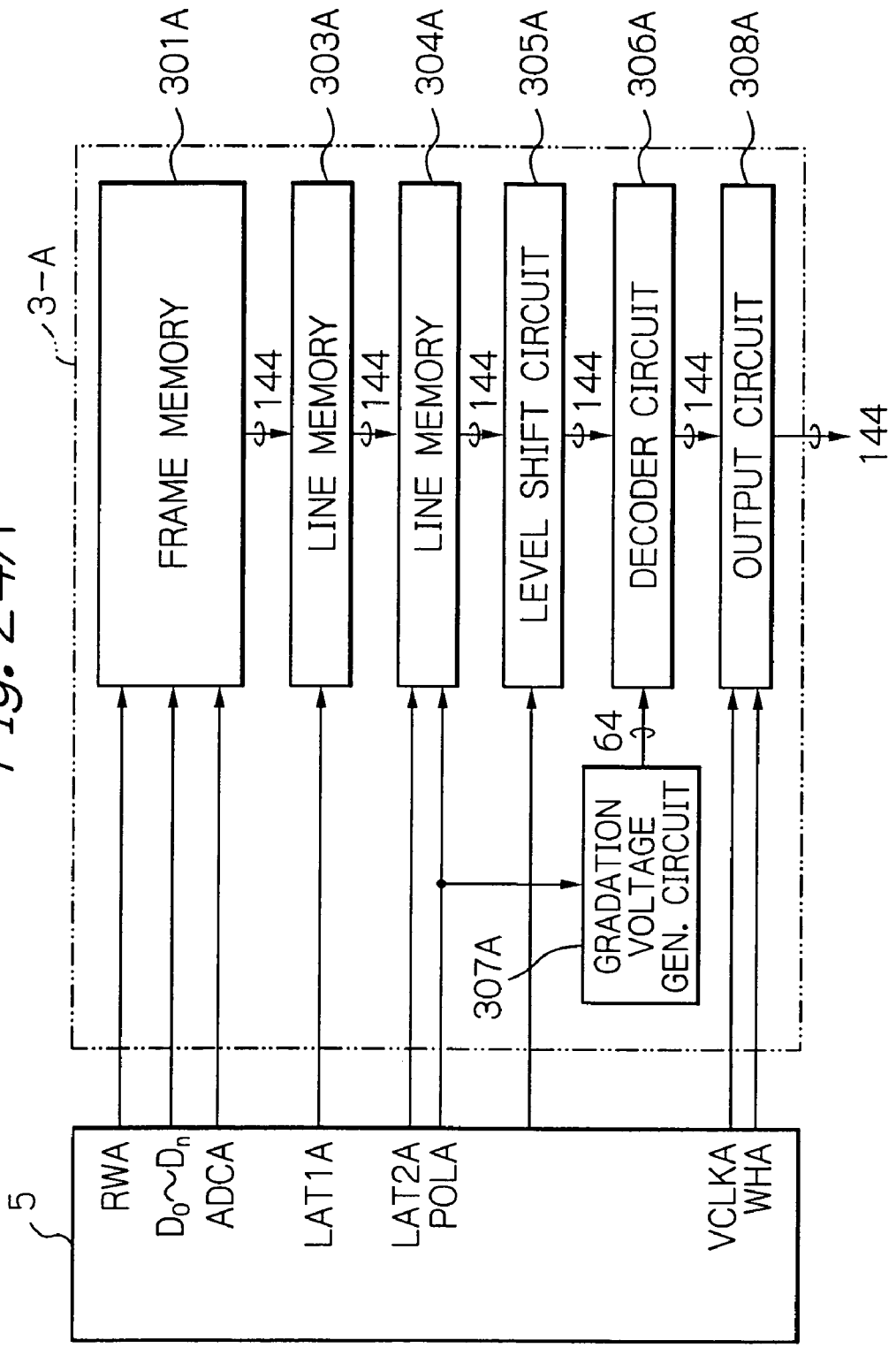
FIGS. 24A and 24B are block circuit diagrams of the data driver circuits of FIG. 23.
Figure 24B:
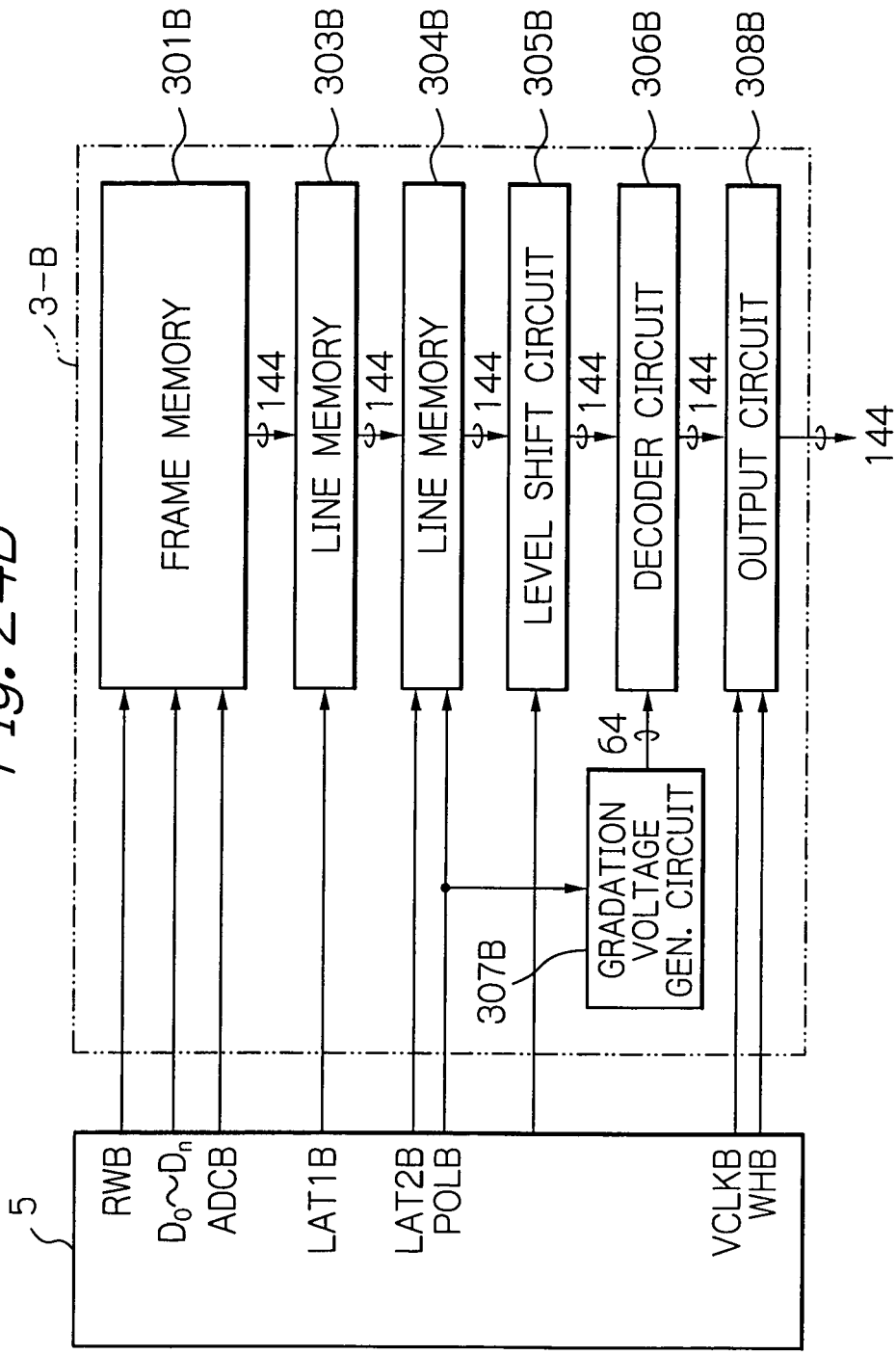

In FIG. 23, which illustrates a third embodiment of the driving apparatus for driving a plurality of display units according to the present invention, although the scan driver circuit 4 is provided commonly for the main LCD unit 1 and the sub LCD unit 2, data driver circuits 3-A and 3-B are provided individually for the main LCD unit 1 and the sub LCD unit 2. In this case, the data driver circuits 3-A and 3-B are illustrated in FIGS. 24A and 24B, respectively. In this case, a gradation voltage generating circuit 301A or 301B has only one gradation voltage generating unit for one of the LCD units 1 and 2. Also, in FIGS. 24A and 24B, frame memories 301A and 301B can be replaced by shift register circuits as illustrated in FIG. 11.

Even in the driving apparatus of FIG. 23, since the scan driver circuit 4 is provided in common for the main LCD unit 1 and the sub LCD unit 2, the apparatus can be decreased in size and in cost without increasing the power consumption.

In the above-described embodiments, although only two LCD units are provided in a mobile telephone apparatus, the present invention can be applied to a driving apparatus for driving three or more LCD units provided in a mobile telephone apparatus. Also, the present invention can be applied to display units such as STN-type LCD units and electro luminescence (EL) display units other than TFT-type LCD units. Further, the present invention can be applied to mobile electronic apparatuses other than a mobile telephone apparatus.

As explained hereinabove, according to the present invention, since at least one of a data driver circuit and a scan driver circuit is provided in common for a plurality of display units, the apparatus can be decreased in size and in cost without increasing the power consumption.

The invention claimed is:

1. An apparatus for driving a plurality of display units, each including a plurality of data lines, a plurality of scan lines and a plurality of pixels each provided at one of said data lines and one of said scan lines, the apparatus comprising:
    at least one of a common data driver circuit and a common scan driver circuit,
    said common data driver circuit including a plurality of first switch groups, each first switch group being connected to the data lines of one of said display units for driving the data lines of said one of said display units,
    said common scan driver circuit including a plurality of second switch groups, each second switch group being connected to the scan lines of one of said display units for driving the scan lines of said one of said display units,
wherein said common data driver circuit comprises:
    a plurality of frame memories for storing video signals, each for one of said display units;
    a plurality of third switch groups each group being connected to one of said frame memories and being operated in synchronization with operations of said first switch groups;
    a line memory, connected to said third switch groups, for selectively storing one line data of said frame memories in accordance with the operations of said third switch groups;
    a gradation voltage generating circuit;
    a decoder circuit, connected to said line memory and said gradation voltage generating circuit, for selecting gradation voltages from said gradation voltage generating circuit in accordance with output signals of said line memory; and
    an output circuit, connected between said decoder circuit and said first switch groups, for transmitting said selected gradation voltages to said first switch groups, so that said selected gradation voltages are transmitted to the data lines of one of said display units in accordance with the operations of said first switch groups.

2. The apparatus as set forth in claim 1, wherein said gradation voltage generating circuit comprises a plurality of gradation voltage generating units each for one of said display units.

3. The apparatus as set forth in claim 1, wherein said output circuit comprises:
    a plurality of voltage followers, connected to said decoder circuit, for amplifying said selected gradation voltages;
    a plurality of first switches each connected to one of said voltage followers; and
    a plurality of second switches each connected between an input of one of said voltage followers and an output of one of said first switches,
    wherein said first switches are turned ON for a first predetermined time period, and then, said second switches are turned ON while said first switches are turned OFF.

4. The apparatus as set forth in claim 3, wherein said output circuit further comprises a plurality of third switches each connected between the output of one of said first switches and a ground, said third switches being turned ON by a control signal when driving of one of said display units is switched to driving of the other of said display units.

5. The apparatus as set forth in claim 1, wherein the at least one of the common data driver circuit and the common scan driver circuit is formed with at least one of said plurality of display units on a single substrate.

6. The apparatus as set forth in claim 1, wherein the apparatus and at least one of the plurality of display units are integrated on a substrate.

7. An apparatus for driving a plurality of display units, each including a plurality of data lines, a plurality of scan lines and a plurality of pixels each provided at one of said data lines and one of said scan lines, the apparatus comprising:
    at least one of a common data driver circuit and a common scan driver circuit,
    said common data driver circuit including a plurality of first switch groups, each first switch group being connected to the data lines of one of said display units for driving the data lines of said one of said display units,
    said common scan driver circuit including a plurality of second switch groups, each second switch group being connected to the scan lines of one of said display units for driving the scan lines of said one of said display units,
wherein said common data driver circuit comprises:
    a shift register circuit for shifting a horizontal start signal in accordance with a horizontal clock signal;
    a line memory, connected to said shift register circuit, for storing one line data in accordance with said shift register circuit;
    a gradation voltage generating circuit;
    a decoder circuit, connected to said line memory and said gradation voltage generating circuit, for selecting gradation voltages from said gradation voltage generating circuit in accordance with output signals of said line memory; and an output circuit, connected between said decoder circuit and said first switch groups, for transmitting said selected gradation voltages to said first switch groups, so that said selected gradation voltages are transmitted to the data lines of one of said display units in accordance with the operations of said first switch groups, wherein said gradation voltage generating circuit comprises a plurality of gradation voltage generating units each for one of said display units.

8. The apparatus as set forth in claim 7, wherein the at least one of the common data driver circuit and the common scan driver circuit is formed with at least one of said plurality of display units on a single substrate.

9. The apparatus as set forth in claim 7, wherein the apparatus and at least one of the plurality of display units are integrated on a substrate.

10. An apparatus for driving a plurality of display units, each including a plurality of data lines, a plurality of scan lines and a plurality of pixels each provided at one of said data lines and one of said scan lines, the apparatus comprising:

at least one of a common data driver circuit and a common scan driver circuit, said common data driver circuit including a plurality of first switch groups, each first switch group being connected to the data lines of one of said display units for driving the data lines of said one of said display units, said common scan driver circuit including a plurality of second switch groups, each second switch group being connected to the scan lines of one of said display units for driving the scan lines of said one of said display units, wherein said common data driver circuit comprises:
  a shift register circuit for shifting a horizontal start signal in accordance with a horizontal clock signal;
  a line memory, connected to said shift register circuit, for storing one line data in accordance with said shift register circuit;
  a gradation voltage generating circuit;
  a decoder circuit, connected to said line memory and said gradation voltage generating circuit, for selecting gradation voltages from said gradation voltage generating circuit in accordance with output signals of said line memory; and
  an output circuit, connected between said decoder circuit and said first switch groups, for transmitting said selected gradation voltages to said first switch groups, so that said selected gradation voltages are transmitted to the data lines of one of said display units in accordance with the operations of said first switch groups, wherein said output circuit comprises:
  a plurality of voltage followers, connected to said decoder circuit, for amplifying said selected gradation voltages;
  a plurality of first switches each connected to one of said voltage followers; and
  a plurality of second switches each connected between an input of one of said voltage followers and an output of one of said first switches,
  wherein said first switches are turned ON for a first predetermined time period, and then, said second switches are turned ON while said first switches are turned OFF.

11. The apparatus as set forth in claim 10, wherein said output circuit further comprises a plurality of third switches each connected between the output of one of said first switches and a ground, said third switches being turned ON by a control signal when driving of one of said display units is switched to driving of the other of said display units.

12. The apparatus as set forth in claim 10, wherein the at least one of the common data driver circuit and the common scan driver circuit is formed with at least one of said plurality of display units on a single substrate.

13. The apparatus as set forth in claim 10, wherein the apparatus and at least one of the plurality of display units are integrated on a substrate.

14. An apparatus for driving a plurality of display units, each including a plurality of data lines, a plurality of scan lines and a plurality of pixels each provided at one of said data lines and one of said scan lines, the apparatus comprising:

at least one of a common data driver circuit and a common scan driver circuit, said common data driver circuit including a plurality of first switch groups, each first switch group being connected to the data lines of one of said display units for driving the data lines of said one of said display units, said common scan driver circuit including a plurality of second switch groups, each second switch group being connected to the scan lines of one of said display units for driving the scan lines of said one of said display units;

an oscillator;

a plurality of first frequency dividers, connected to said oscillator, for frequency-dividing an output signal of said oscillator to generate horizontal clock signals;

a fifth switch group connected to said first frequency dividers;

a plurality of second frequency dividers, connected to said oscillator, for frequency-dividing the output signal of said oscillator to generate vertical clock signals;

a sixth switch group connected to said second frequency dividers; and a frequency control circuit, connected to said fifth and sixth switch groups, for selecting and turning ON one switch of said fifth switch group and one switch of said sixth switch group, so that the data lines of said one of said display units are driven by a selected one of said horizontal clock signals and the scan lines of said one of said display units are driven by a selected one of said vertical clock signals, thus always realizing a definite frame frequency of said one of said display units.

15. The apparatus as set forth in claim 14, wherein the at least one of the common data driver circuit and the common scan driver circuit is formed with at least one of said plurality of display units on a single substrate.

16. The apparatus as set forth in claim 14, wherein the apparatus and at least one of the plurality of display units are integrated on a substrate.

17. An apparatus for driving a plurality of display units, each including a plurality of data lines, a plurality of scan line and a plurality of pixels each provided at one of said data lines and said scan lines, the apparatus comprising:

a single common data driver circuit including a plurality of first switch groups, each first switch group being connected to the data lines of one of said display units for driving the data lines of said one of said display units; and a plurality of scan driver circuits, each connected to the scan lines of one of said display units, for driving the scan lines of said one of said display units, wherein said single common data driver circuit comprises:
  a plurality of frame memories for storing video signals, each for one of said display units;

a plurality of third switch groups each group being connected to one of said frame memories and being operated in synchronization with operations of said first switch groups;

a line memory, connected to said third switch groups, for selectively storing one line data of said frame memories in accordance with the operations of said third switch groups;

a gradation voltage generating circuit;

a decoder circuit, connected to said line memory and said gradation voltage generating circuit, for selecting gradation voltages from said gradation voltage generating circuit in accordance with output signals of said line memory; and an output circuit, connected between said decoder circuit and said first switch groups, for transmitting said selected gradation voltages to said first switch groups, so that said selected gradation voltages are transmitted to the data lines of one of said display units in accordance with the operations of said first switch groups.

18. The apparatus as set forth in claim 17, wherein said gradation voltage generating circuit comprises a plurality of gradation voltage generating units each for one of said display units.

19. The apparatus as set forth in claim 17, wherein said output circuit comprises:
a plurality of voltage followers, connected to said decoder circuit, for amplifying said selected gradation voltages;
a plurality of first switches each connected to one of said voltage followers; and
a plurality of second switches each connected between an input of one of said voltage followers and an output of one of said first switches,
wherein said first switches are turned ON for a first predetermined time period, and then, said second switches are turned ON while said first switches are turned OFF.

20. The apparatus as set forth in claim 17, wherein said output circuit further comprises a plurality of third switches each connected between the output of one of said first switches and a ground, said third switches being turned ON by a control signal when driving of one of said display units is switched to driving of the other of said display units.

21. The apparatus as set forth in claim 17, wherein the at least one of the common data driver circuit and the common scan driver circuit is formed with at least one of said plurality of display units on a single substrate.

22. The apparatus as set forth in claim 17, wherein the apparatus and at least one of the plurality of display units are integrated on a substrate.

23. An apparatus for driving a plurality of display units, each including a plurality of data lines, a plurality of scan line and a plurality of pixels each provided at one of said data lines and said scan lines, the apparatus comprising:
a single common data driver circuit including a plurality of first switch groups, each first switch group being connected to the data lines of one of said display units for driving the data lines of said one of said display units; and
a plurality of scan driver circuits, each connected to the scan lines of one of said display units, for driving the scan lines of said one of said display units,
wherein said single common data driver circuit comprises:
a shift register circuit for shifting a horizontal start signal in accordance with a horizontal clock signal;

a line memory, connected to said shift register circuit, for storing one line data in accordance with said shift register circuit;

a gradation voltage generating circuit;

a decoder circuit, connected to said line memory and said gradation voltage generating circuit, for selecting gradation voltages from said gradation voltage generating circuit in accordance with output signals of said line memory; and an output circuit, connected between said decoder circuit and said first switch groups, for transmitting said selected gradation voltages to said first switch groups, so that said selected gradation voltages are transmitted to the data lines of one of said display units in accordance with operations of said first switch groups, wherein said gradation voltage generating circuit comprises a plurality of gradation voltage generating units each for one of said display units.

24. The apparatus as set forth in claim 23, wherein said output circuit comprises:
a plurality of voltage followers, connected to said decoder circuit, for amplifying said selected gradation voltages;
a plurality of first switches each connected to one of said voltage followers; and
a plurality of second switches each connected between an input of one of said voltage followers and an output of one of said first switches,
wherein said first switches are turned ON for a first predetermined time period, and then, said second switches are turned ON while said first switches are turned OFF.

25. The apparatus as set forth in claim 24, wherein said output circuit further comprises a plurality of third switches each connected between the output of one of said first switches and a ground, said third switches being turned ON by a control signal when driving of one of said display units is switched to driving of the other of said display units.

26. The apparatus as set forth in claim 23, wherein the at least one of the common data driver circuit and the common scan driver circuit is formed with at least one of said plurality of display units on a single substrate.

27. The apparatus as set forth in claim 23, wherein the apparatus and at least one of the plurality of display units are integrated on a substrate.

28. An apparatus for driving a plurality of display units, each including a plurality of data lines, a plurality of scan line and a plurality of pixels each provided at one of said data lines and said scan lines, the apparatus comprising:
a single common data driver circuit including a plurality of first switch groups, each first switch group being connected to the data lines of one of said display units for driving the data lines of said one of said display units; and
a plurality of scan driver circuits, each connected to the scan lines of one of said display units, for driving the scan lines of said one of said display units;
an oscillator;
a plurality of first frequency dividers, connected to said oscillator, for frequency-dividing an output signal of said oscillator to generate horizontal clock signals;
a fourth switch group connected to said first frequency dividers;
a plurality of second frequency dividers, connected to said oscillator, for frequency-dividing the output signal of said oscillator to generate vertical clock signals;
a fifth switch group connected to said second frequency dividers; and a frequency control circuit, connected to said fourth and fifth switch groups, for selecting and turning ON one switch of said fifth switch group and one switch of said fifth switch group, so that the data lines of said one of said display units are driven by a selected one of said horizontal clock signals and the scan lines of said one of said display units are driven by a selected one of said vertical clock signals, thus always realizing a definite frame frequency of said one of said display units.

29. The apparatus as set forth in claim 28, wherein the at least one of the common data driver circuit and the common scan driver is formed with at least one of said plurality of display units on a single substrate.

30. The apparatus as set forth in claim 28, wherein the apparatus and at least one of the plurality of display units are integrated on a substrate.

31. A panel unit comprising:
a plurality of display units, each including a plurality of data lines, a plurality of scan lines and a plurality of pixels, each of the plurality of pixels provided at one of said data lines and one of said scan lines; and
a driver unit,
wherein the driver unit comprises:
at least one of a common data driver circuit and a common scan driver circuit,
said common data driver circuit including a plurality of first switch groups, each first switch group being connected to the data lines of one of said display units for driving the data lines of said one of said display units,
said common scan driver circuit including a plurality of second switch groups, each second switch group being connected to the scan lines of one of said display units for driving the scan lines of said one of said display units,
wherein said common data driver circuit comprises:
a plurality of frame memories for storing video signals, each for one of said display units;
a plurality of third switch groups each group being connected to one of said frame memories and being operated in synchronization with operations of said first switch groups;
a line memory, connected to said third switch groups, for selectively storing one line data of said frame memories in accordance with the operations of said third switch groups;
a gradation voltage generating circuit;
a decoder circuit, connected to said line memory and said gradation voltage generating circuit, for selecting gradation voltages from said gradation voltage generating circuit in accordance with output signals of said line memory; and
an output circuit, connected between said decoder circuit and said first switch groups, for transmitting said selected gradation voltages to said first switch groups, so that said selected gradation voltages are transmitted to the data lines of one of said display units in accordance with the operations of said first switch groups.

32. The panel unit as set forth in claim 31, wherein the driver unit and at least one of the plurality of display units are formed on a single substrate.

* * * * *